(12) United States Patent
Wyville

(10) Patent No.: US 10,129,010 B2
(45) Date of Patent: Nov. 13, 2018

(54) DUAL-MODE RADIO SYSTEM HAVING A FULL-DUPLEX MODE AND A HALF-DUPLEX MODE

(71) Applicant: Telefonaktiebolaget LM Ericsson (publ), Stockholm (SE)

(72) Inventor: Mark Wyville, Ottawa (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 1 day.

(21) Appl. No.: 15/318,087

(22) PCT Filed: Jul. 11, 2014

(86) PCT No.: PCT/IB2014/063048
§ 371 (c)(1),
(2) Date: Dec. 12, 2016

(87) PCT Pub. No.: WO2016/005797
PCT Pub. Date: Jan. 14, 2016

(65) Prior Publication Data
US 2017/0111164 A1    Apr. 20, 2017

(51) Int. Cl.
*H04J 3/00* (2006.01)
*H04L 5/16* (2006.01)
(Continued)

(52) U.S. Cl.
CPC ............. *H04L 5/16* (2013.01); *H04B 1/525* (2013.01); *H04W 84/042* (2013.01); *H04W 88/08* (2013.01)

(58) Field of Classification Search
CPC . H04L 5/16; H04L 1/02; H04B 1/525; H04W 88/08
(Continued)

(56) References Cited

U.S. PATENT DOCUMENTS

| 5,940,452 A | * | 8/1999 | Rich | H04B 7/0874 375/347 |
| 7,250,830 B2 | * | 7/2007 | Layne | H04B 1/0057 333/126 |

(Continued)

FOREIGN PATENT DOCUMENTS

| GB | 2498559 A | 7/2013 |
| WO | 2013091187 A1 | 6/2013 |

OTHER PUBLICATIONS

Duarte, Melissa et al., "Experiment-Driven Characterization of Full-Duplex Wireless Systems," IEEE Transactions on Wireless Communications, vol. 11, Issue 12, Dec. 2012, IEEE, pp. 4296-4307.

(Continued)

*Primary Examiner* — Chi H Pham
*Assistant Examiner* — Alexander O Boakye
(74) *Attorney, Agent, or Firm* — Patent Portfolio Builders, PLLC

(57) ABSTRACT

Embodiments of a dual-mode radio system are disclosed. In one embodiment, the radio system includes a first radio unit including a transmitter, a receiver, an antenna, and switching circuitry adapted to couple either an output of the transmitter of the first radio unit or an input of the receiver of the first radio unit to the antenna of the first radio unit. In addition, the radio system includes a second radio unit including an antenna and either a transmitter having an output coupled to the antenna of the second radio unit, a receiver having an input coupled to the antenna of the second radio unit, or both a transmitter having an output selectively coupled to the antenna of the second radio unit and a receiver having an input selectively coupled to the antenna of the second radio unit. The radio system has both a full-duplex mode and a half-duplex mode.

25 Claims, 25 Drawing Sheets

(51) Int. Cl.
　　　*H04B 1/525*　　(2015.01)
　　　*H04W 84/04*　　(2009.01)
　　　*H04W 88/08*　　(2009.01)

(58) Field of Classification Search
　　　USPC ........................................................ 370/280
　　　See application file for complete search history.

(56)　　　　　　　　References Cited

U.S. PATENT DOCUMENTS

| 8,199,681 B2 | 6/2012 | Zinser et al. |
| 8,515,493 B1 | 8/2013 | Jensen et al. |
| 2014/0016524 A1 | 1/2014 | Choi et al. |

OTHER PUBLICATIONS

Duarte, Melissa et al., "Full-Duplex Wireless Communications Using Off-The-Shelf Radios: Feasibility and First Results," Conference Record of the Forty Fourth Asilomar Conference on Signals, Systems and Computers, Nov. 7-10, 2010, Pacific Grove, CA, IEEE, 5 pages.
Riihonen, Taneli, "Recent Advances in Full-Duplex Relaying," XXXIII Finnish URSI Convention on Radio Science, Session B2, Apr. 24, 2013, Finland, Aalto University, pp. 1-56.
International Search Report and Written Opinion for International Patent Application No. PCT/IB2014/063048, dated Oct. 7, 2014, 11 pages.

\* cited by examiner

| SUBFRAME | #0 | #1 | #2 | #3 | #4 | #5 | #6 | #7 | #8 | #9 |
|---|---|---|---|---|---|---|---|---|---|---|
| GROUP 1 | DL | DL | DL | DL | DL | DL | DL | UL | UL | UL |
| GROUP 2 | UL | UL | UL | UL | UL | DL | DL | DL | DL | DL |

FIG. 17

| SUBFRAME | #0 | #1 | #2 | #3 | #4 | #5 | #6 | #7 | #8 | #9 |
|---|---|---|---|---|---|---|---|---|---|---|
| GROUP 1 | DL | DL | DL | DL | DL | DL | DL | DL | UL | UL |
| GROUP 2 | UL | UL | UL | UL | DL | DL | DL | DL | DL | DL |
| GROUP 3 | UL | UL | UL | UL | UL | DL | DL | DL | DL | DL |

FIG. 19

DUAL-MODE RADIO SYSTEM HAVING A FULL-DUPLEX MODE AND A HALF-DUPLEX MODE

This application is a 35 U.S.C. § 371 national phase filing of International Application No. PCT/IB2014/063048, filed Jul. 11, 2014, the disclosure of which is incorporated herein by reference in its entirety.

FIELD OF THE DISCLOSURE

The present disclosure relates to a radio system for a wireless communication node having both a full-duplex mode of operation and a half-duplex mode of operation.

BACKGROUND

Currently, there is increasing interest in a full-duplex radio system, particularly for a base station of a cellular communications network. As used herein, a full-duplex radio system is a radio system that both transmits and receives using the same time and frequency resources. Thus, for a base station, a full-duplex radio system is a radio system that simultaneously transmits the downlink and receives the uplink using the same frequency resources. The primary challenge in a full-duplex radio system is detecting a weak received signal in the presence of a much stronger transmit signal. Isolation between the received signal and the transmit signal is normally achieved with filtering in a Frequency Division Duplexing (FDD) radio system or by using a half-duplex scheme, such as in a Time Division Duplexing (TDD) radio system. However, neither of these techniques can be applied to provide isolation in a full-duplex radio system.

Thus, there is a need for systems and methods for providing isolation between the received signal and the transmit signal in a full-duplex radio system.

SUMMARY

Systems and methods relating to a dual-mode radio system having both a full-duplex mode of operation and a half-duplex mode of operation are disclosed. In one embodiment, the radio system is a radio system for a wireless node in a wireless communications system (e.g., a base station in a cellular communications network). In one embodiment, the radio system includes a first radio unit including a transmitter, a receiver, an antenna, and switching circuitry adapted to couple either an output of the transmitter of the first radio unit or an input of the receiver of the first radio unit to the antenna of the first radio unit. In addition, the radio system includes a second radio unit including an antenna and either a transmitter having an output coupled to the antenna of the second radio unit, a receiver having an input coupled to the antenna of the second radio unit, or both a transmitter having an output selectively coupled to the antenna of the second radio unit and a receiver having an input selectively coupled to the antenna of the second radio unit. The radio system has a full-duplex mode of operation in which the radio system operates to simultaneously transmit and receive on the same frequency channel, and a half-duplex mode of operation in which the radio system operates to transmit and receive on the same frequency channel at different times.

In one embodiment, the second radio unit includes a transmitter, a receiver, an antenna, and switching circuitry adapted to couple either an output of the transmitter of the second radio unit or an input of the receiver of the second radio unit to the antenna of the second radio unit. Further, in one embodiment, when operating in the full-duplex mode of operation, the transmitter of the first radio unit is active and the switching circuitry of the first radio unit couples the output of the transmitter of the first radio unit to the antenna of the first radio unit, and the receiver of the second radio unit is active and the switching circuitry of the second radio unit couples the input of the receiver of the second radio unit to the antenna of the second radio unit. Still further, in one embodiment, when operating in a transmit phase of the half-duplex mode of operation, the transmitter of the first radio unit is active and the switching circuitry of the first radio unit couples the output of the transmitter of the first radio unit to the antenna of the first radio unit, and the transmitter of the second radio unit is active and the switching circuitry of the second radio unit couples the output of the transmitter of the second radio unit to the antenna of the second radio unit. When operating in a receive phase of the half-duplex mode of operation, the receiver of the first radio unit is active and the switching circuitry of the first radio unit couples the input of the receiver of the first radio unit to the antenna of the first radio unit, and the receiver of the second radio unit is active and the switching circuitry of the second radio unit couples the input of the receiver of the second radio unit to the antenna of the second radio unit.

In another embodiment, the radio system includes a first group of radio units and a second group of radio units. The first group of radio units includes the first radio unit and one or more additional first radio units. Each radio unit in the first group of radio units includes a transmitter, a receiver, an antenna, and switching circuitry adapted to couple either an output of the transmitter of the radio unit in the first group of radio units or an input of the receiver of the radio unit in the first group of radio units to the antenna of the radio unit. The second group of radio units includes the second radio unit and one or more additional second radio units. Each radio unit in the second group of radio units includes an antenna and either a transmitter having an output coupled to the antenna of the radio unit in the second group of radio units, a receiver having an input coupled to the antenna of the radio unit in the second group of radio units, or both a transmitter having an output selectively coupled to the antenna of the radio unit in the second group of radio units and a receiver having an input selectively coupled to the antenna of the radio unit in the second group of radio units. In one embodiment, each radio unit in the second group of radio units includes the receiver but not the transmitter. In another embodiment, each radio unit in the second group of radio units includes the transmitter but not the receiver. In yet another embodiment, each radio unit in the second group of radio units includes a transmitter, a receiver, an antenna, and switching circuitry adapted to couple either an output of the transmitter of the radio unit in the second group of radio units or an input of the receiver of the radio unit in the second group of radio units to the antenna of the radio unit in the second group of radio units.

Further, in the full-duplex mode of operation, for each radio unit in the first group of radio units, the transmitter of the radio unit in the first group of radio units is active and the switching circuitry of the radio unit in the first group of radio units couples the output of the transmitter of the radio unit in the first group of radio units to the antenna of the radio unit in the first group of radio units. For each radio unit in the second group of radio units, the receiver of the radio unit in the second group of radio units is active and the switching circuitry of the radio unit in the second group of radio units couples the input of the receiver of the radio unit in the second group of radio units to the antenna of the radio unit in the second group of radio units. In one embodiment, when operating in a transmit phase of the half-duplex mode of operation, for each radio unit in the first group of radio units, the transmitter of the radio unit in the first group of radio units is active and the switching circuitry of the radio unit in the first group of radio units couples the output of the transmitter of the radio unit in the first group of radio units to the antenna of the radio unit in the first group of radio units. For each radio unit in the second group of radio units, the transmitter of the radio unit in the second group of radio units is active and the switching circuitry of the radio unit in the second group of radio units couples the output of the transmitter of the radio unit in the second group of radio units to the antenna of the radio unit in the second group of radio units. When operating in a receive phase of the half-duplex mode of operation, for each radio unit in the first group of radio units, the receiver of the radio unit in the first group of radio units is active and the switching circuitry of the radio unit in the first group of radio units couples the input of the receiver of the radio unit in the first group of radio units to the antenna of the radio unit in the first group of radio units. For each radio unit in the second group of radio units, the receiver of the radio unit in the second group of radio units is active and the switching circuitry of the radio unit in the second group of radio units couples the input of the receiver of the radio unit in the second group of radio units to the antenna of the radio unit in the second group of radio units.

In one embodiment, when operating in the full-duplex mode of operation, the transmitter of one of the first and second radio units is idle and is utilized to provide self-interference cancellation. In another embodiment, when operating in the full-duplex mode of operation, the receiver of one of the first and second radio units is idle and is utilized to provide self-interference cancellation.

In one embodiment, the second radio unit includes at least a receiver, and the radio system is configured to receive a training sequence transmitted by a wireless device via the receiver of each of the first and second radio units, and estimate Channel State Information (CSI) for a channel between the wireless device and each antenna of the first and second radio units based on the training sequence received via the receiver of each of the radio units in the first group of radio units and the second group of radio units. In another embodiment, the second radio unit includes at least a transmitter, and the radio system is configured to transmit a training sequence for channel estimation between the radio system and one or more wireless devices via the transmitter of each of the first and second radio units.

In one embodiment, the second radio unit includes a transmitter, a receiver, an antenna, and switching circuitry adapted to couple either an output of the transmitter of the second radio unit or an input of the receiver of the second radio unit to the antenna of the second radio unit. When operating in the full-duplex mode of operation, the first radio unit and the second radio unit have different Time Division Duplexing (TDD) configurations. In one embodiment, the different TDD configurations include different TDD uplink to downlink ratios. In another embodiment, the different TDD configurations include different TDD transmit phases and different TDD receive phases. In one embodiment, different sets of wireless devices operating in a TDD mode of operation are connected to the first radio unit and the second radio unit.

In one embodiment, a TDD transmit phase of the first radio unit is anti-phase with a TDD transmit phase of the second radio unit, and a TDD receive phase of the first radio unit is anti-phase with a TDD receive phase of the second radio unit.

In one embodiment, when operating in the full-duplex mode of operation, during a first phase of the full-duplex mode of operation, the transmitter of the first radio unit is active and the switching circuitry of the first radio unit couples the output of the transmitter of the first radio unit to the antenna of the first radio unit, and the receiver of the second radio unit is active and the switching circuitry of the second radio unit couples the input of the receiver of the second radio unit to the antenna of the second radio unit. During a second phase of the full-duplex mode of operation, the receiver of the first radio unit is active and the switching circuitry of the first radio unit couples the input of the receiver of the first radio unit to the antenna of the first radio unit, and the transmitter of the second radio unit is active and the switching circuitry of the second radio unit couples the output of the transmitter of the second radio unit to the antenna of the second radio unit.

In one embodiment, the radio system further includes one or more additional units, wherein the first radio unit, the second radio unit, and the one or more additional radio units have different TDD configurations. In one embodiment, a TDD transmit phase of at least one of the first radio unit, the second radio unit, and the one or more additional radio units partially overlaps a TDD receive phase of at least one other of the first radio unit, the second radio unit, and the one or more additional radio units.

In one embodiment, the wireless communications system is a cellular communications network, and the wireless node is a base station.

In one embodiment, the wireless communications system is a cellular communications network, and the wireless node is a wireless device connected to the cellular communications network.

In one embodiment, the second radio unit includes the receiver but not the transmitter. In another embodiment, the second radio unit includes the transmitter but not the receiver.

Those skilled in the art will appreciate the scope of the present disclosure and realize additional aspects thereof after reading the following detailed description of the embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 1:
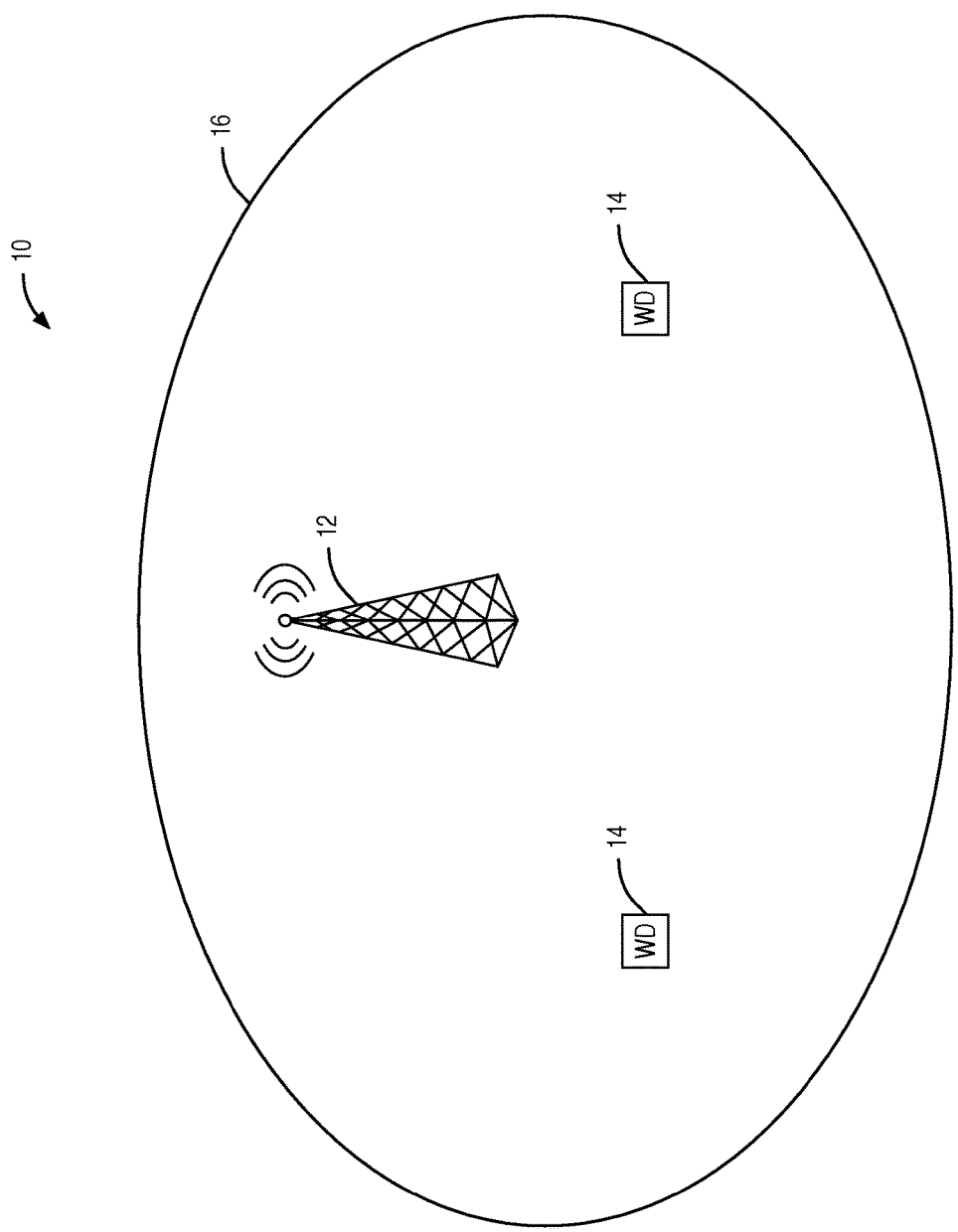
FIG. 1 illustrates one example of a cellular communications network including a wireless node having a dual-mode radio system according to one embodiment of the present disclosure.
Figure 2:
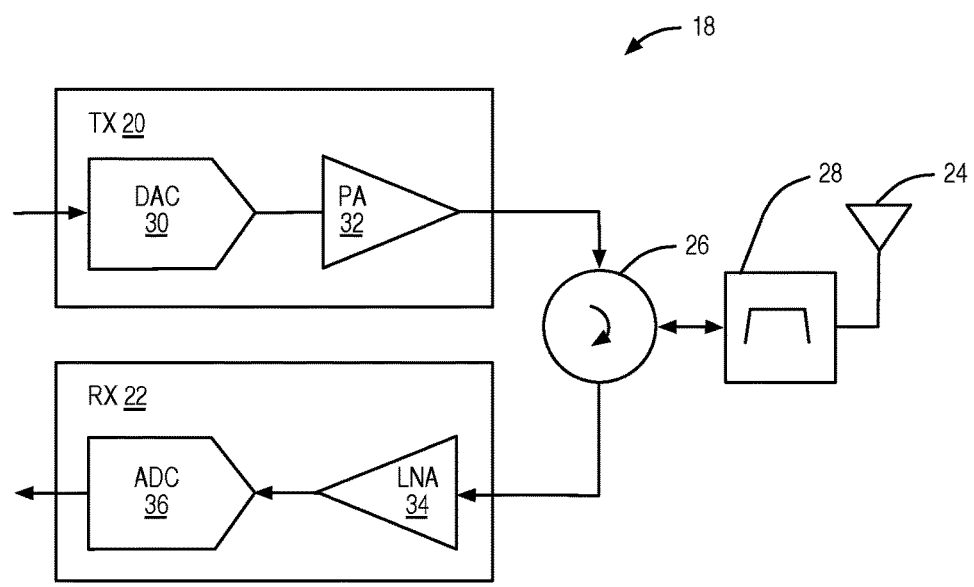
FIG. 2 illustrates a dual-mode radio system having a common antenna architecture.
Figure 3A:
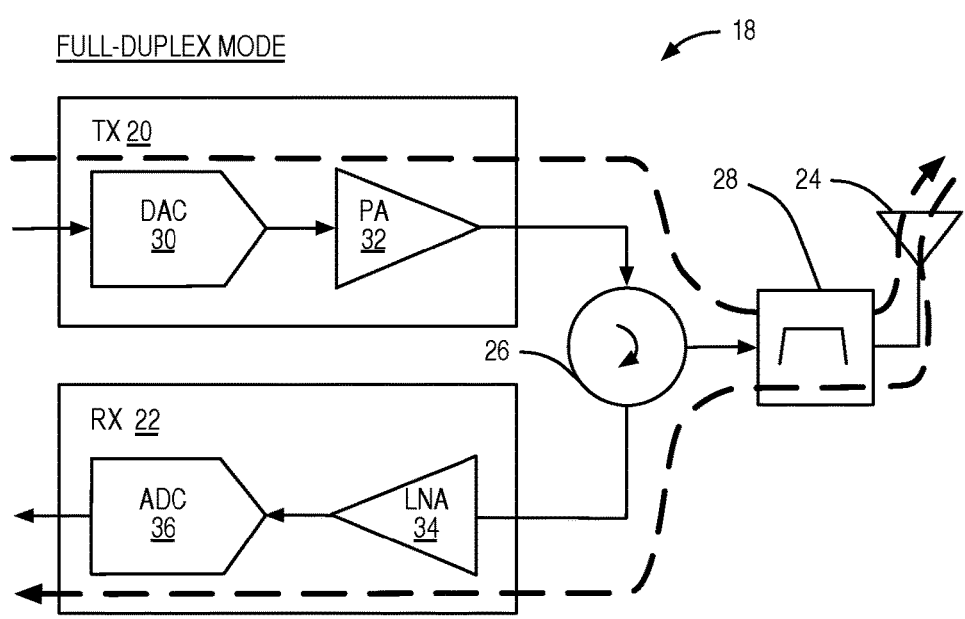
Figures 3B, 3C:
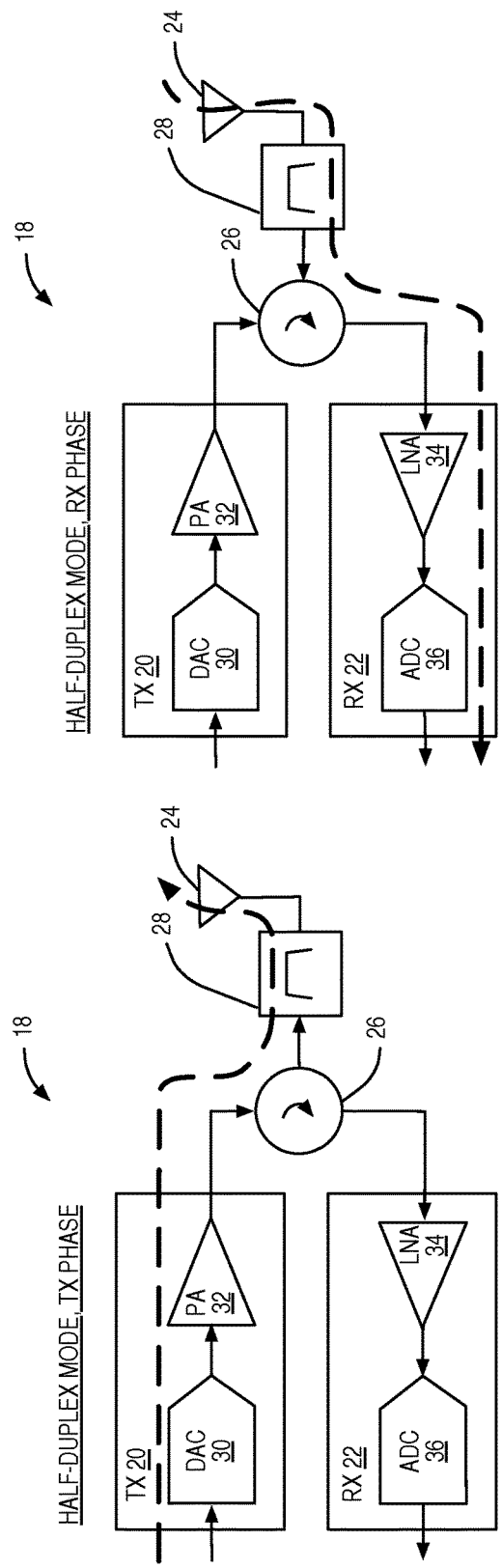
Figure 4:
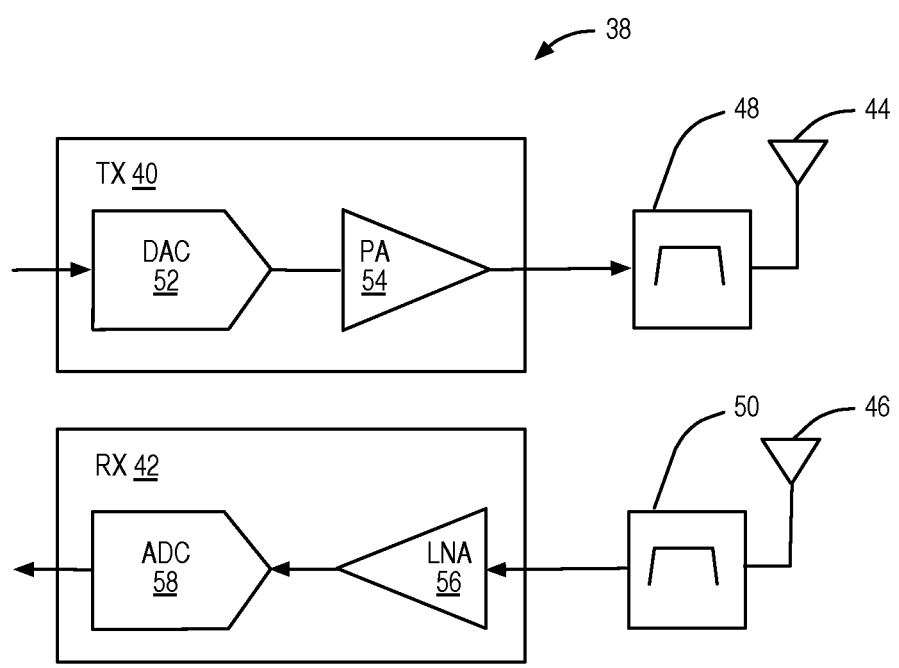
Figure 5A:
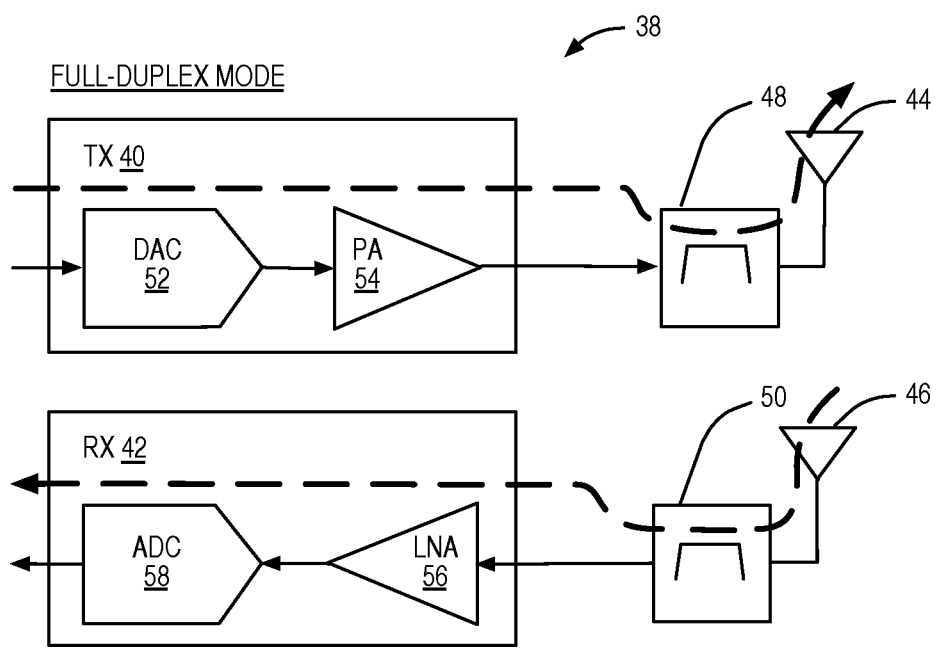
Figure 5C:
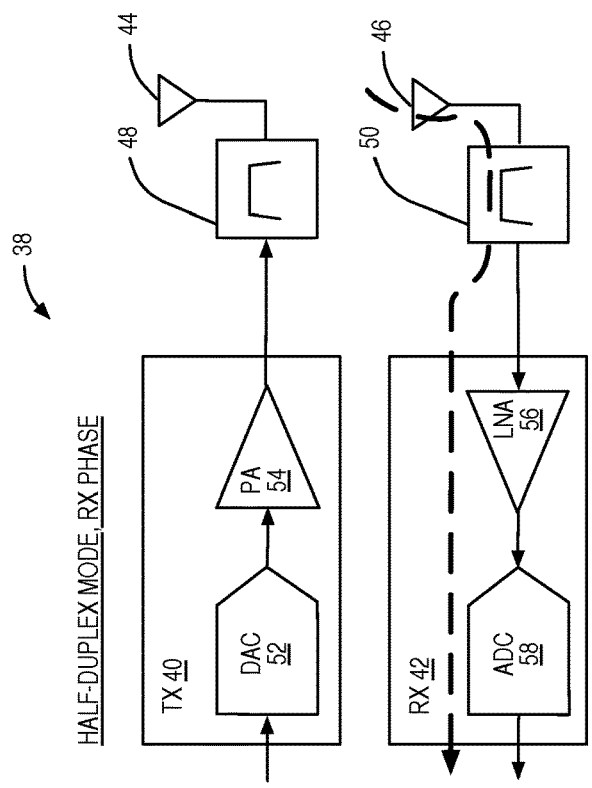
Figure 5B:
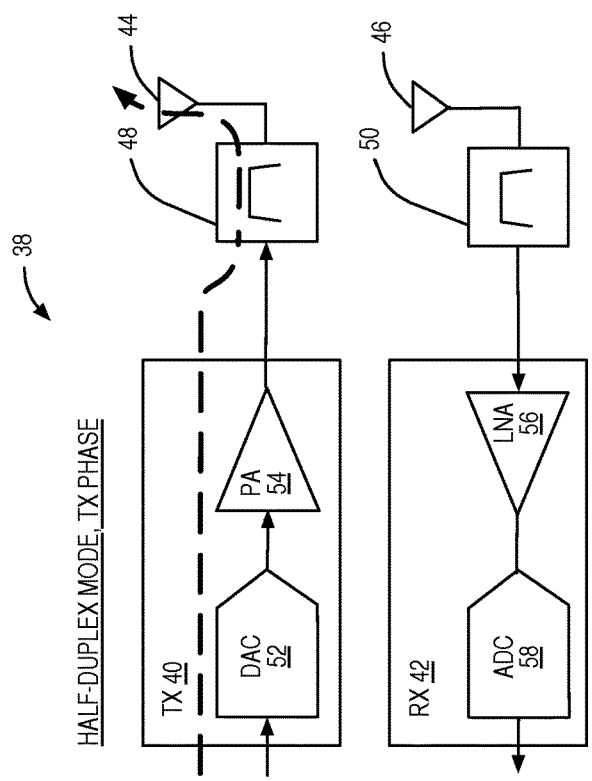
Figure 6:
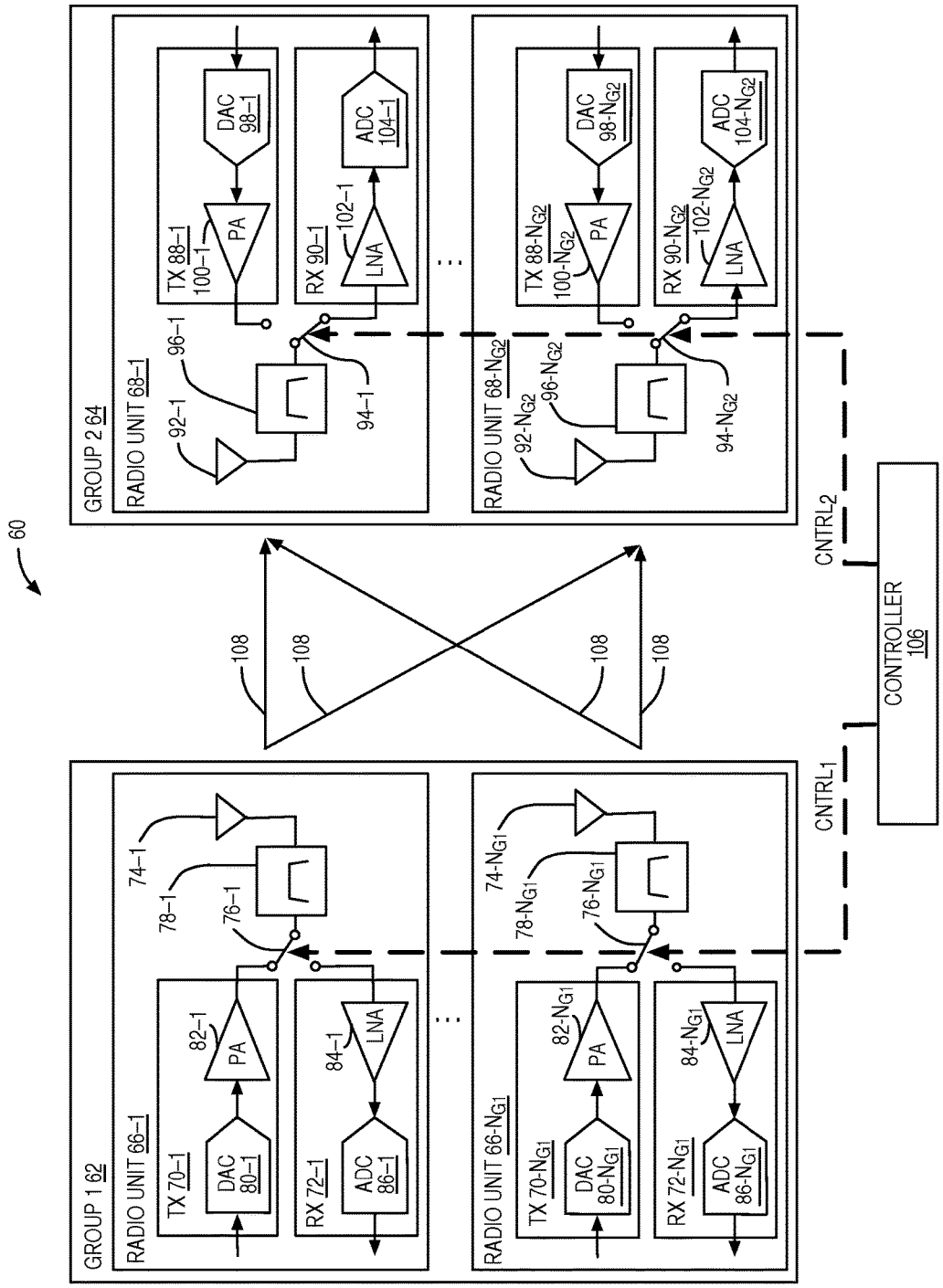
Figure 7A:
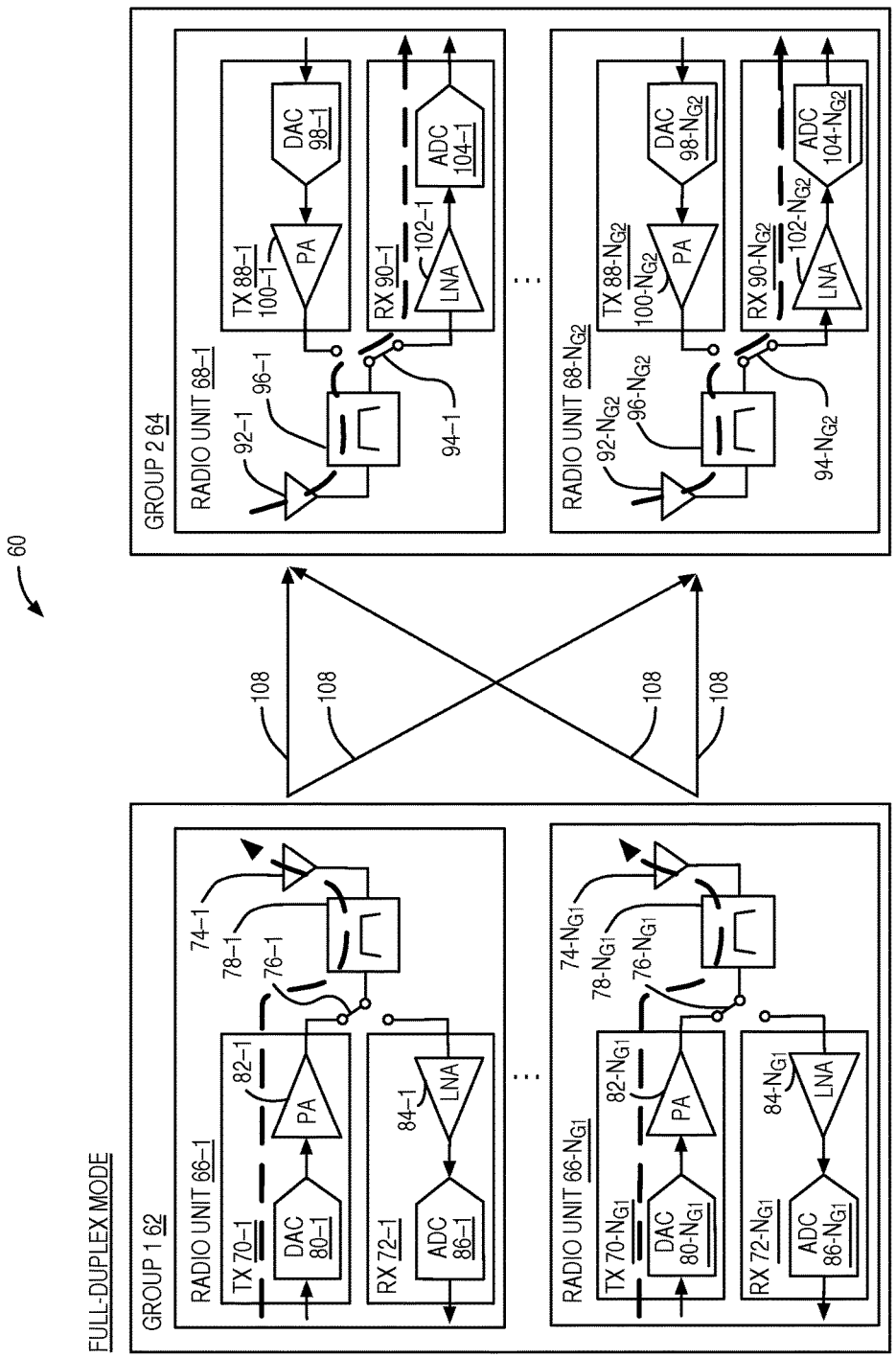
Figure 7B:
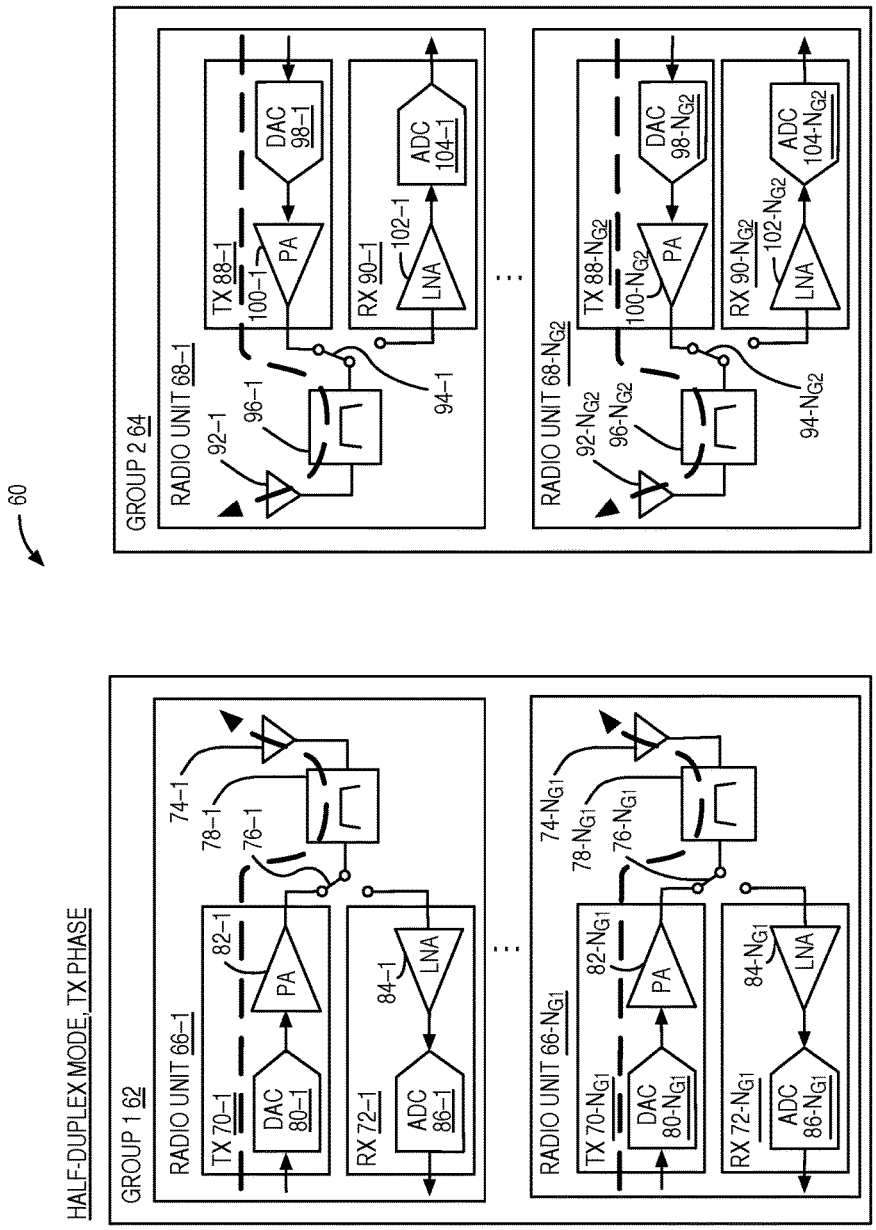
Figure 7C:
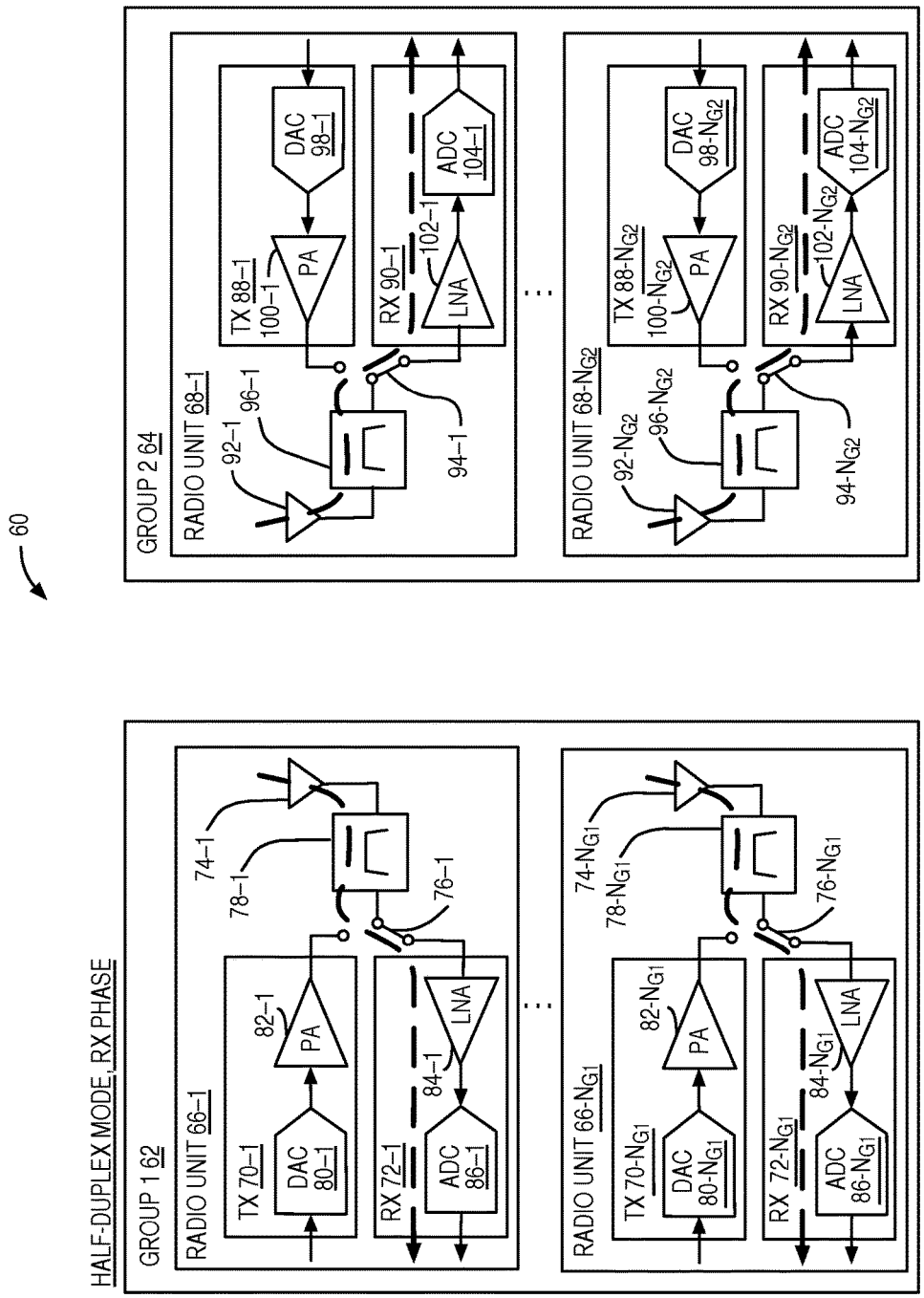
Figure 8:
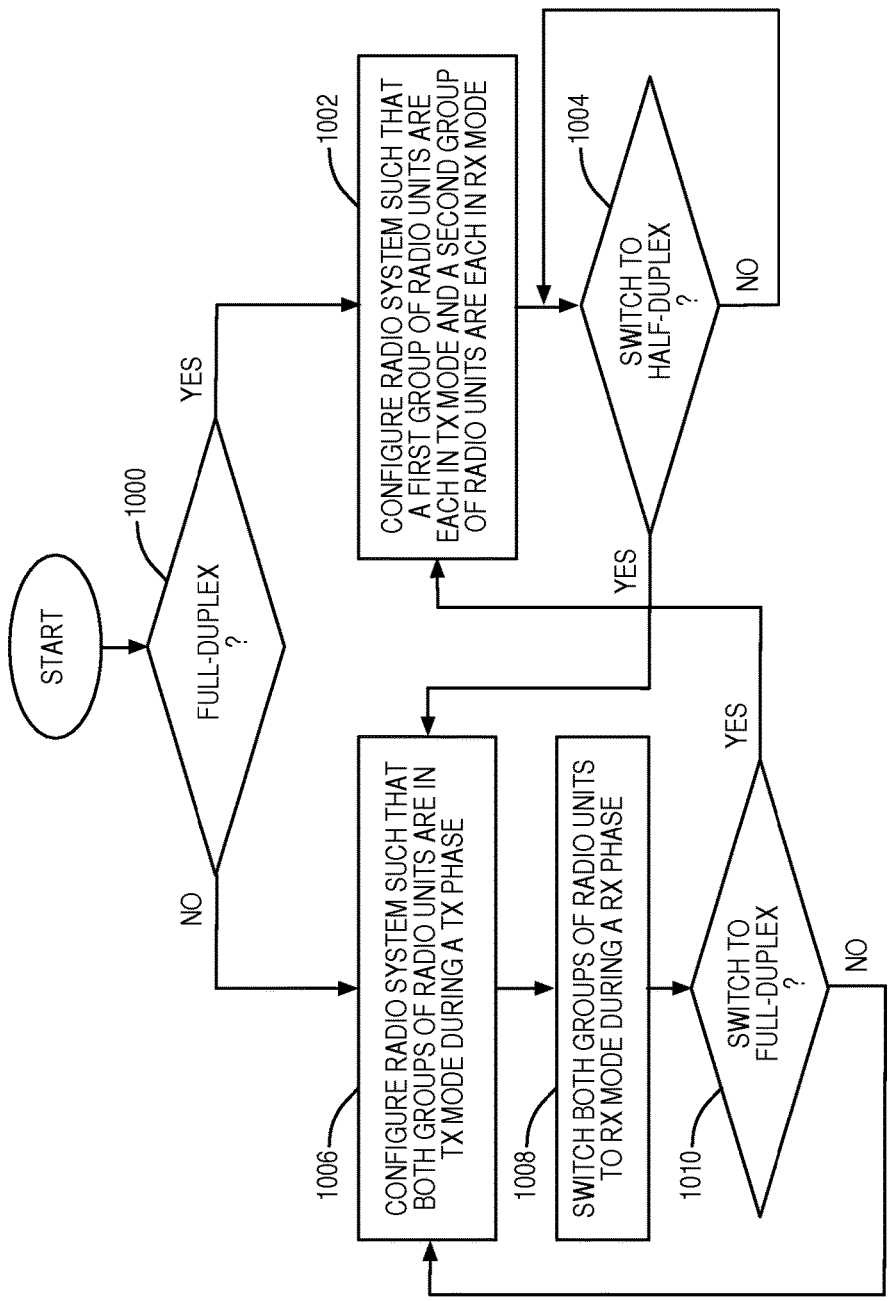
Figure 9:
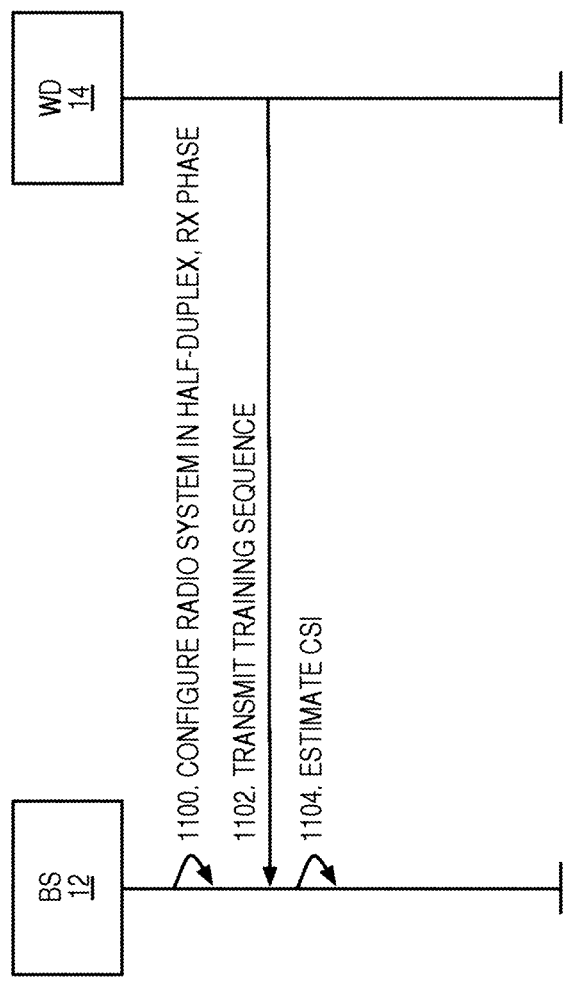
Figure 10:
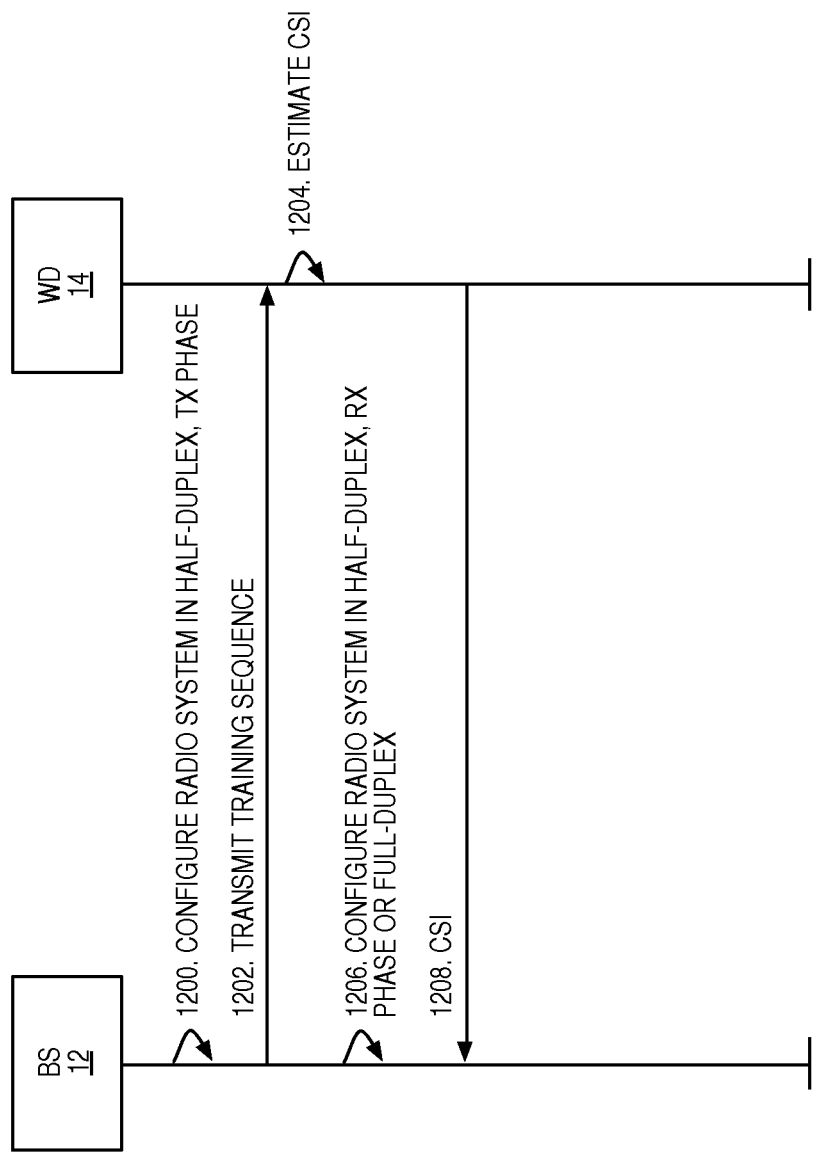
Figure 11:
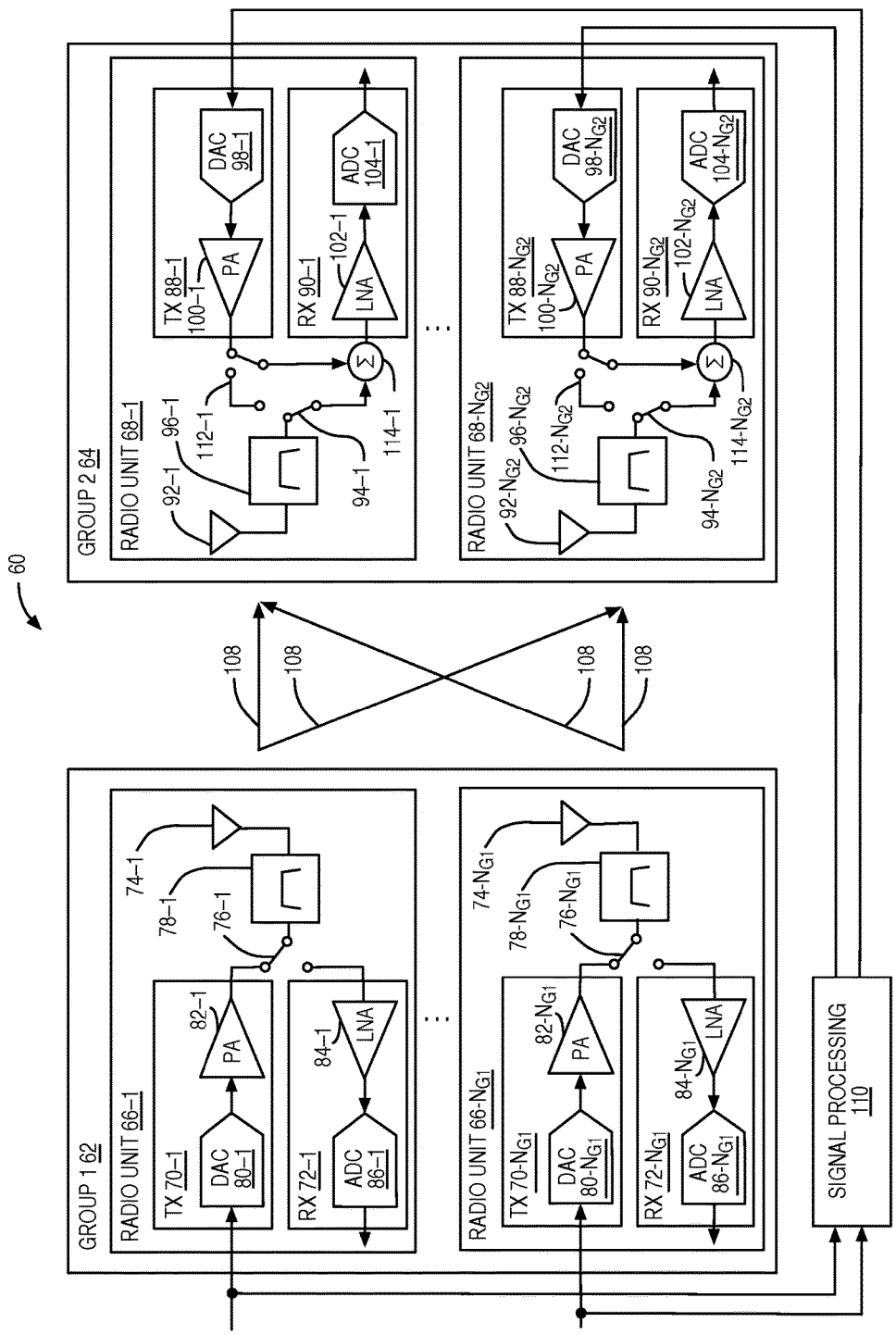
Figure 12:
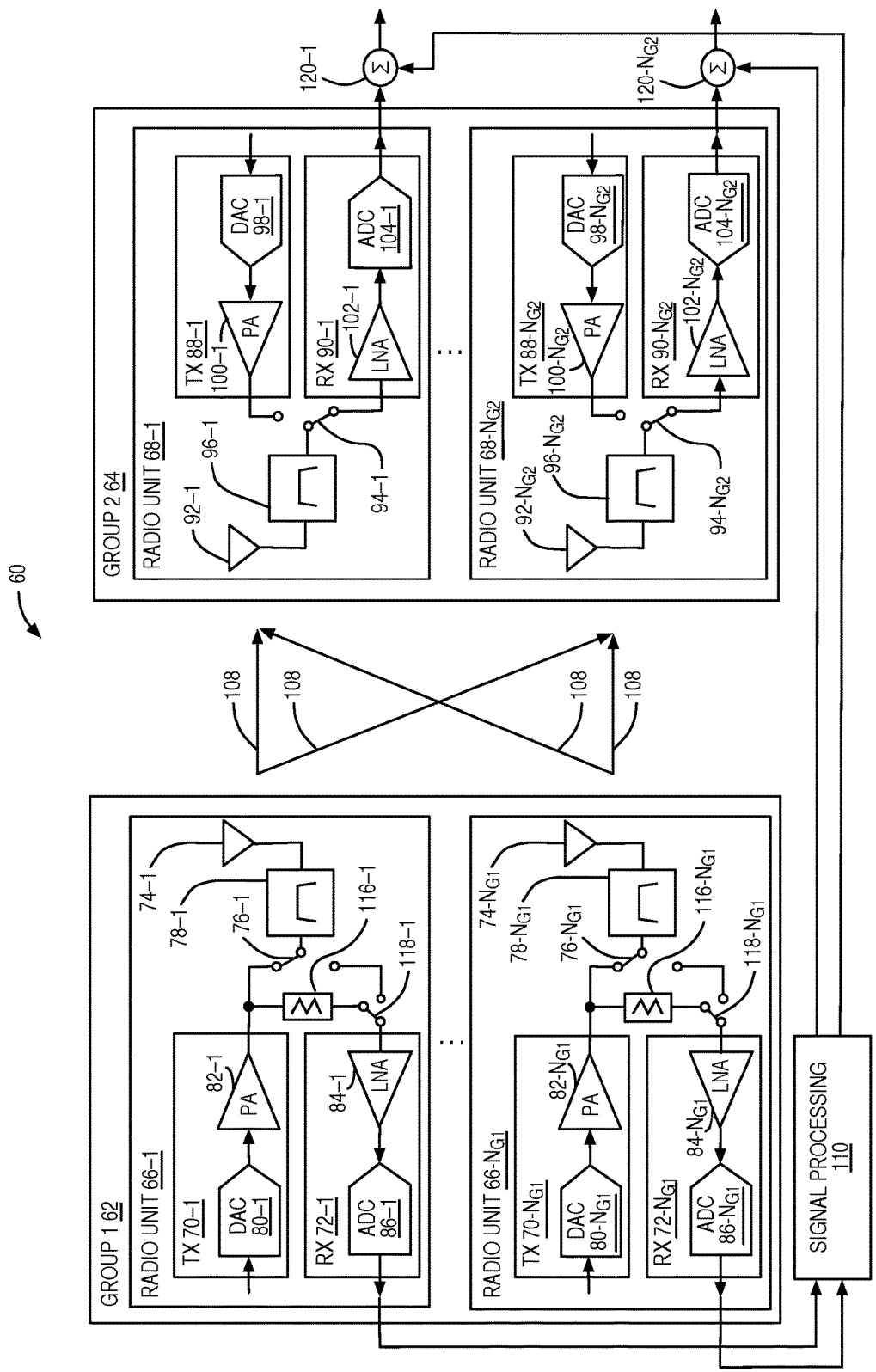
Figure 13:
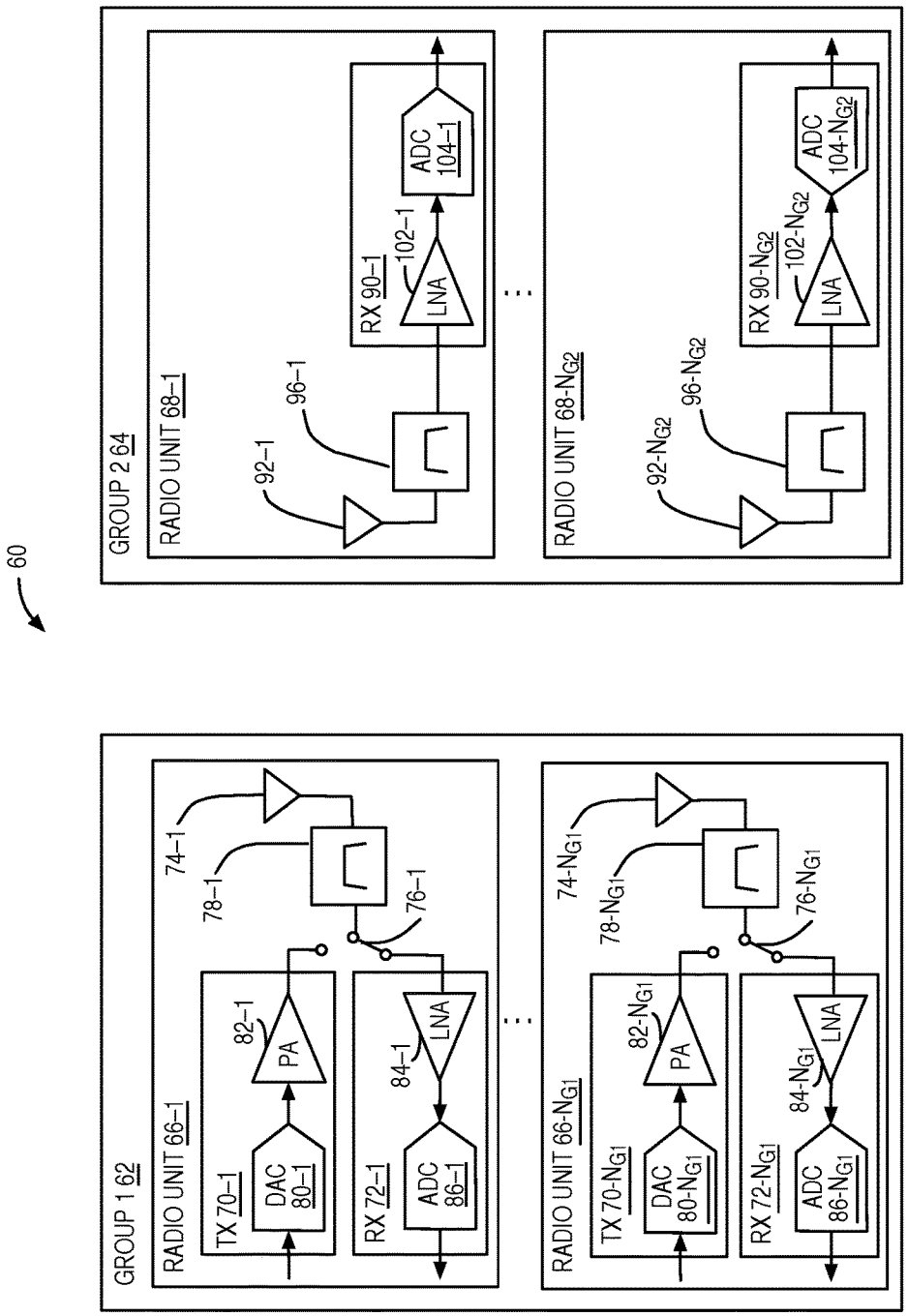
Figure 14:
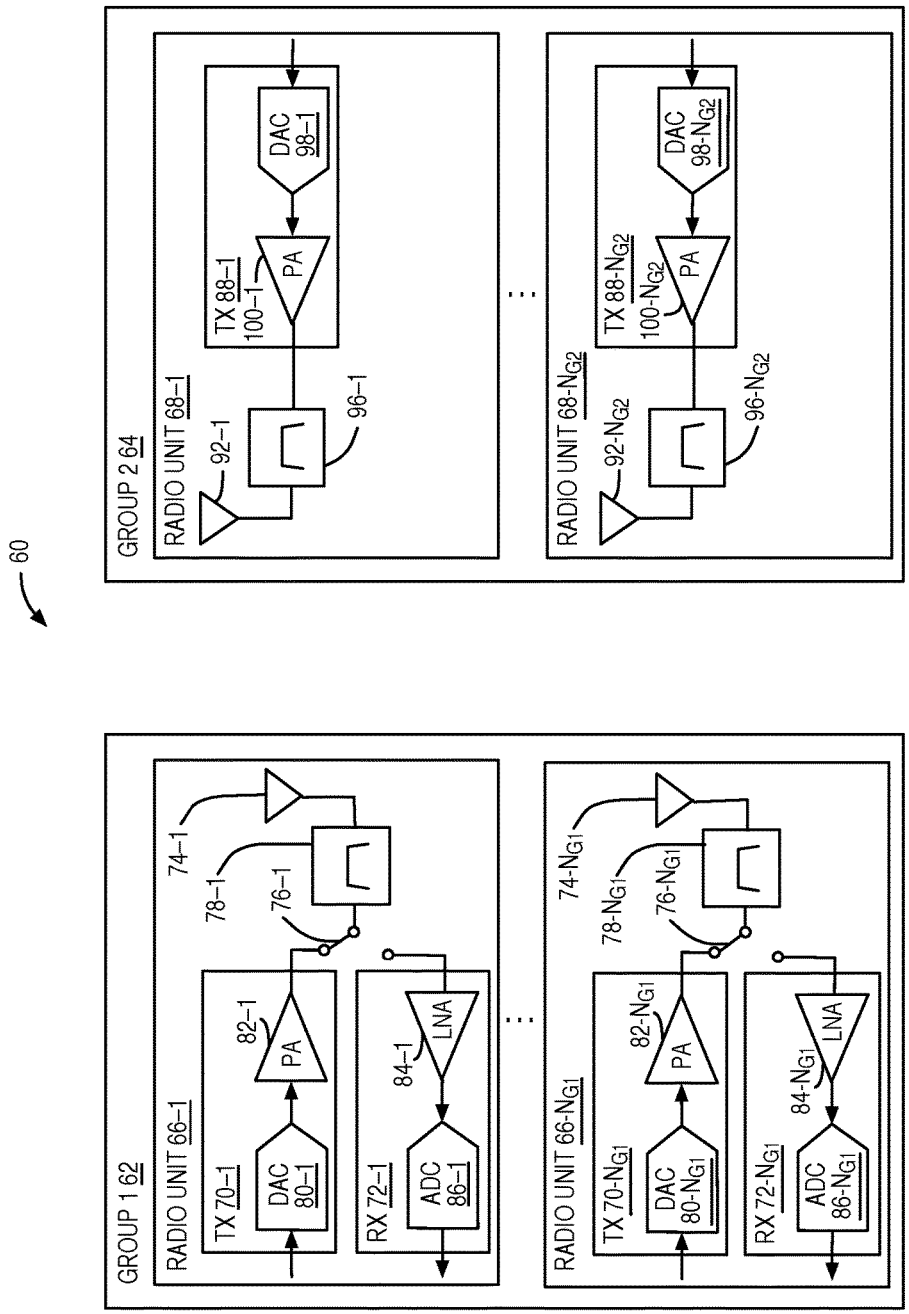
Figure 18:
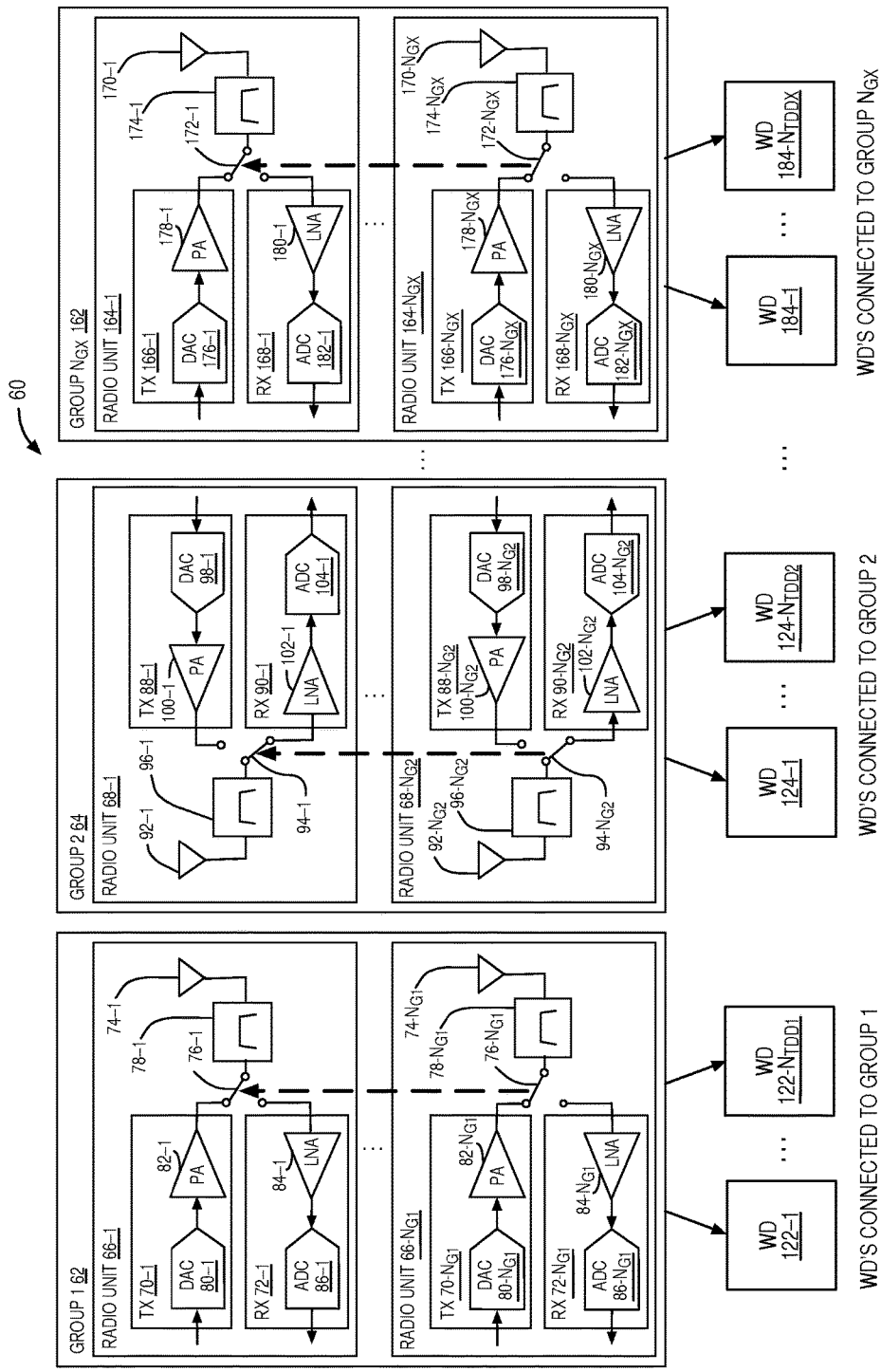
Figure 20:
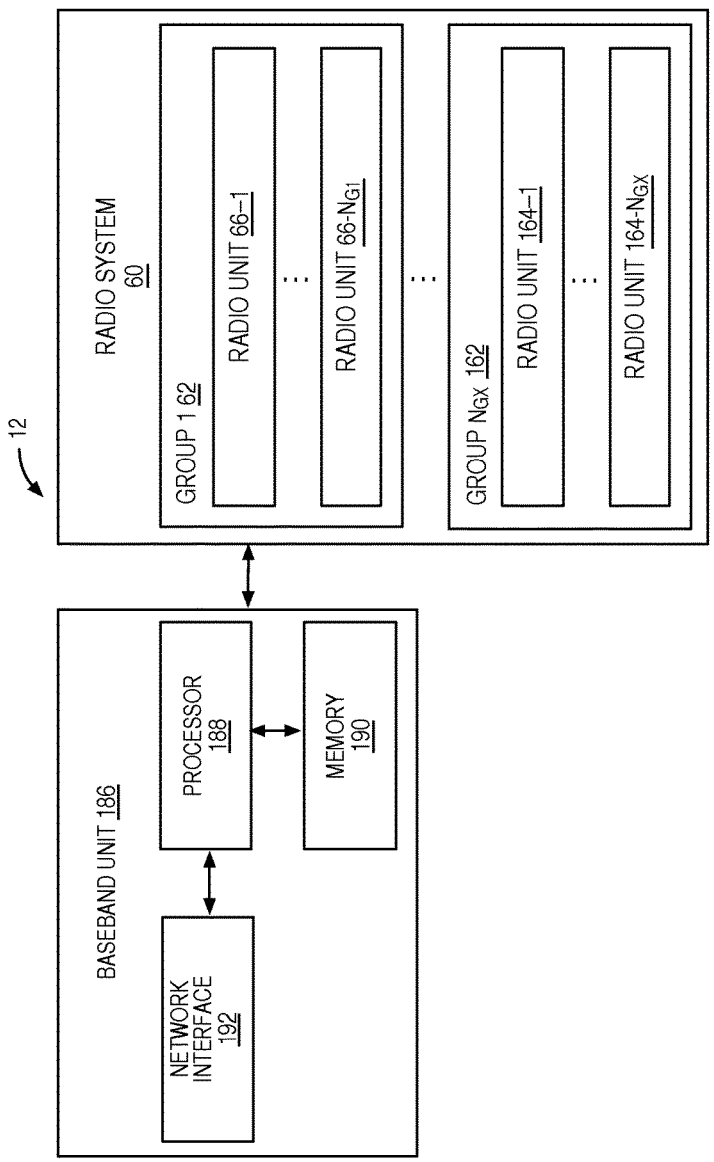
Figure 21:
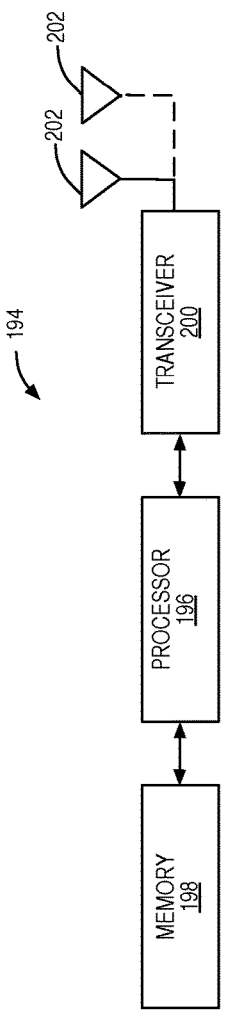

FIGS. 3A, 3B, and 3C illustrate a full-duplex mode of operation and a half-duplex mode of operation of the radio system of FIG. 2;

FIG. 4 illustrates a dual-mode radio system having a separate antenna architecture;

FIGS. 5A, 5B, and 5C illustrate a full-duplex mode of operation and a half-duplex mode of operation of the radio system of FIG. 4;

FIG. 6 illustrates a dual-mode radio system according to one embodiment of the present disclosure;

FIGS. 7A, 7B, and 7C illustrate a full-duplex mode of operation and a half-duplex mode of operation of the radio system of FIG. 6 according to one embodiment of the present disclosure;

FIG. 8 is a flow chart that illustrates a method of controlling the mode of operation of the dual-mode radio system of FIG. 6 according to one embodiment of the present disclosure;

FIG. 9 illustrates one embodiment of a channel estimation procedure using the dual-mode radio system of FIG. 6 according to one embodiment of the present disclosure;

FIG. 10 illustrates another embodiment of a channel estimation procedure using the dual-mode radio system of FIG. 6 according to one embodiment of the present disclosure;

FIG. 11 illustrates one embodiment of the dual-mode radio system of FIG. 6 in which, during full-duplex operation, idle transmitters are utilized for self-interference cancellation according to one embodiment of the present disclosure;

FIG. 12 illustrates one embodiment of the dual-mode radio system of FIG. 6 in which, during full-duplex operation, idle receivers are utilized for self-interference cancellation according to one embodiment of the present disclosure;

FIG. 13 illustrates one embodiment of the dual-mode radio system of FIG. 6 in which one of the groups of radio units includes only receivers according to one embodiment of the present disclosure;

FIG. 14 illustrates one embodiment of the dual-mode radio system of FIG. 6 in which one of the groups of radio units includes only transmitters according to one embodiment of the present disclosure;

FIGS. 15A through 15C and 16 illustrate full-duplex operation of the dual-mode radio system of FIG. 6 according to another embodiment of the present disclosure;

FIG. 17 illustrates one example of a radio frame where different radio unit groups of the radio system operate in anti-phase with one another according to one embodiment of the present disclosure;

FIG. 18 illustrates the dual-mode radio system of FIG. 6 according to another embodiment in which the radio system includes more than two groups of radio units;

FIG. 19 illustrates one example of a radio frame where different radio unit groups of the radio system of FIG. 18 have different Time Division Duplexing (TDD) configurations according to one embodiment of the present disclosure;

FIG. 20 is a block diagram of the base station of FIG. 1 according to one embodiment of the present disclosure; and FIG. 21 is a block diagram of a wireless device according to one embodiment of the present disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Systems and methods related to a dual-mode radio system having both a full-duplex mode and a half-duplex mode are disclosed. Further, when operating in the full-duplex mode, the radio system provides isolation between transmit and receive signals. In a full-duplex radio system, isolation between the receive signal and the transmit signal can be achieved with passive isolation and/or active self-interference cancellation. Many of the embodiments described herein relate primarily to passive isolation. However, it should be understood that the passive isolation can be utilized together with known or future developed self-interference cancellation techniques to provide a desired level of isolation between the transmit and receive signals.

Further, the embodiments described herein focus on a radio system for a base station in a cellular communications network. One example of a cellular communications network 10 is illustrated in FIG. 1. As illustrated, the cellular communications network 10 includes a base station 12 serving wireless devices 14 in a corresponding cell 16 of the cellular communications network 10. In the embodiments described herein, the base station 12 is equipped with a dual-mode radio system (not shown) that, when operating in a full-duplex mode, operates to simultaneously transmit and receive using the same frequency resources (i.e., the same downlink and uplink frequency channels). Thus, in other words, the radio system enables the simultaneous downlink transmission and uplink reception for the cell 16 using the same frequency resources when operating in the full-duplex mode. While the radio system is described primarily as being implemented in the base station 12, the radio system may be implemented in any wireless communication node in the cellular communications network 10 (e.g., other radio access nodes, the wireless devices 14, etc.). Further, while the description herein focuses on the cellular communications network 10, the embodiments described herein are equally applicable to other wireless communications systems in which a wireless node including a dual-mode radio system is desirable.

Before specifically describing embodiments of the present disclosure, a brief description of two basic architectures of a dual-mode radio system and their associated problems is beneficial. In this regard, FIG. 2 illustrates a dual-mode radio system 18 including a transmitter (TX) 20 and a receiver (RX) 22 coupled to a common antenna 24 via a circulator 26 and a filter 28. In this example, the transmitter 20 is illustrated as including a Digital-to-Analog Converter (DAC) 30 and a Power Amplifier (PA) 32. However, as will be appreciated by one of ordinary skill in the art, the transmitter 20 may include additional components that are not illustrated such as, for example, filter(s), mixer(s), modulator(s), etc. Similarly, the receiver 22 is illustrated as including a Low Noise Amplifier (LNA) 34 and an Analog-to-Digital Converter (ADC) 36. As will be appreciated by one of ordinary skill in the art, the receiver 22 may include additional components that are not illustrated such as, for example, filter(s), mixer(s), demodulator(s), etc.

In operation, the transmitter 20 receives a digital input signal and processes the digital input signal to provide a Radio Frequency (RF) transmit signal at a desired carrier frequency. The RF transmit signal is passed through the circulator 26 and through the filter 28 to the antenna 24. In a similar manner, an RF receive signal is received at the antenna 24 and passed through the filter 28 and the circulator 26 to the receiver 22. The receiver 22 processes the RF receive signal to provide a digital output signal. Notably, the RF transmit signal and the RF receive signal are at the same carrier frequency, or in other words use the same frequency resources. As illustrated in FIG. 3A, for full-duplex operation, the RF receive signal is received at the same time that the RF transmit signal is transmitted by the dual-mode radio system 18. As illustrated in FIGS. 3B and 3C, the dual-mode radio system 18 can revert to a half-duplex mode of operation by activating and deactivating the transmitter 20 and the receiver 22 according to a desired Time Division Duplexing (TDD) configuration. In particular, during a transmit phase, the transmitter 20 receives an input signal and generates a corresponding RF transmit signal that is then transmitted via the antenna 24, as illustrated in FIG. 3B. During the transmit phase, the receiver 22 is inactive. Conversely, during a receive phase, the receiver 22 is active and operates to receive an RF receive signal and generate a corresponding digital output signal, as illustrated in FIG. 3C. During the receive phase, the transmitter 20 is inactive. Having dual-mode operation (i.e., both full-duplex and half-duplex) is beneficial because it may be desirable to revert to the half-duplex mode of operation if, e.g., there are reliability issues with a self-interference cancellation subsystem of the dual-mode radio system 18 (not shown). If the performance of the self-interference cancellation subsystem significantly degrades, then uplink capacity will decrease.

FIG. 4 illustrates a dual-mode radio system 38 including a transmitter (TX) 40 and a receiver (RX) 42 coupled to separate antennas 44 and 46 via corresponding filters 48 and 50. By being physically separated, the separate antennas 44 and 46 provide passive isolation between the transmit signal and the receive signal during full-duplex operation. In this example, the transmitter 40 is illustrated as including a DAC 52 and a PA 54. However, as will be appreciated by one of ordinary skill in the art, the transmitter 40 may include additional components that are not illustrated such as, for example, filter(s), mixer(s), modulator(s), etc. Similarly, the receiver 42 is illustrated as including a LNA 56 and an ADC 58. As will be appreciated by one of ordinary skill in the art, the receiver 42 may include additional components that are not illustrated such as, for example, filter(s), mixer(s), demodulator(s), etc.

In operation, the transmitter 40 receives a digital input signal and processes the digital input signal to provide an RF transmit signal at a desired carrier frequency. The RF transmit signal is passed through the filter 48 to the antenna 44 (i.e., the transmit antenna). In a similar manner, an RF receive signal is received at the antenna 46 (i.e., the receive antenna) and passed through the filter 50 to the receiver 42. The receiver 42 processes the RF receive signal to provide a digital output signal. Notably, the RF transmit signal and the RF receive signal are at the same carrier frequency, or in other words use the same frequency resources. As illustrated in FIG. 5A, for full-duplex operation, the RF receive signal is received at the same time that the RF transmit signal is transmitted by the dual-mode radio system 38. In particular, the RF transmit signal is transmitted via the transmit antenna 44 at the same time that the RF receive signal is received via the receive antenna 46. As illustrated in FIGS. 5B and 5C, the dual-mode radio system 38 can revert to a half-duplex mode of operation by activating and deactivating the transmitter 40 and the receiver 42 according to a desired TDD configuration. In particular, during a transmit phase, the transmitter 40 receives a digital input signal and generates a corresponding RF transmit signal that is then transmitted via the transmit antenna 44, as illustrated in FIG. 5B. During the transmit phase, the receiver 42 is inactive. Conversely, during a receive phase, the receiver 42 is active and operates to receive an RF receive signal from the receive antenna 46 and generate a corresponding digital output signal, as illustrated in FIG. 5C. During the receive phase, the transmitter 40 is inactive.

Both the common antenna architecture of FIG. 2 and the separate antenna architecture of FIG. 4 have issues. In particular, the common antenna architecture of FIG. 2 results in much more stringent requirements on self-interference cancellation as compared to the separate antenna architecture. The passive isolation provided by the circulator 26 (or other duplexing device) can be limited to, e.g., 20 decibels (dB), and can be even worse if there is some impedance mismatch in the filter 28 or the antenna 24 that are located on the antenna side of the circulator 26. In the common antenna architecture, the self-interference cancellation subsystem (not shown) must cancel the residual transmitter leakage into the receiver 22, and the requirement can exceed 100 dB. If the self-interference cancellation subsystem is not able to consistently provide the required cancellation, then the dual-mode radio system 18 will need to revert back to half-duplex operation to avoid significantly degrading the uplink capacity. A very strong self-interference cancellation requirement will degrade reliability, thereby potentially preventing the dual-mode radio system 18 from operating in full-duplex mode for an appreciable amount of time.

For the separate antenna architecture of FIG. 4, significantly more passive transmitter-receiver (TX-RX) isolation can be realized using the separate antennas 44 and 46 for the transmitter 40 and the receiver 42. This architecture relaxes the cancellation requirements of the self-interference cancellation subsystem, thereby making this dual-mode radio system 38 more reliable, and perhaps making a full-duplex radio feasible under real cellular network conditions. The problem with the separate antennas architecture is that the separate antennas 44 and 46 are needed for reliable operation of full-duplex; however, the separate antennas 44 and 46 are not needed for half-duplex operation. During half-duplex operation, only one of the antennas 44 and 46 are active during the TX and RX phases, as illustrated in FIGS. 5B and 5C. Only using half of the available antenna aperture during half-duplex operation results in lower capacity than if the whole antenna aperture was used.

Another issue with separate antenna architecture of FIG. 4 is related to estimating Channel State Information (CSI). Many modern base stations use active antenna techniques to improve spectral and/or energy efficiency. Active antenna techniques require knowledge of downlink and uplink channels between each antenna on the base station and each antenna on each wireless device (which may sometimes be referred to as a User Equipment device (UE)). This knowledge is called CSI. The CSI is most commonly obtained by transmitting training sequences or signals (e.g., pilot signals). More specifically, a transmitter transmits a training sequence, which in turn is received by the receiver on the other end of the radio link. At the receiver, the received training sequence is used to estimate the channel response since the receiving radio has perfect knowledge of the training sequence transmitted by the transmitter. If using a shared or common antenna for both transmit and receive, the channel is assumed to be reciprocal and, as such, training or CSI estimation is only required in one direction. However, with the separate antenna architecture, both the uplink channel and the downlink channel would need to be estimated separately, thereby eliminating the benefits of channel reciprocity. Training in the uplink and training in the downlink do not generally consume the same amount of capacity.

So, the additional training necessary for separate transmit and receive antennas could significantly increase the overhead, thereby reducing capacity.

FIG. 6 illustrates a dual-mode radio system 60 providing both full-duplex and half-duplex operation according to one embodiment of the present disclosure. As discussed below in detail, the dual-mode radio system 60 provides TX-RX isolation during full-duplex operation by using separate transmit and receive antennas and avoids unused antennas during half-duplex operation. As illustrated, the dual-mode radio system 60 includes two radio unit groups 62 and 64. The first radio unit group 62 includes a number of radio units 66-1 through 66-$N_{G1}$ (generally referred to herein collectively as radio units 66 and individually as radio unit 66), and the second radio unit group 64 includes a number of radio units 68-1 through 68-$N_{G2}$ (generally referred to herein collectively as radio units 68 and individually as radio unit 68). While in the illustrated example $N_{G1}>1$ and $N_{G2}>1$, the number of radio units 66 in the first radio unit group 62 may be any number greater than or equal to 1, and the number of radio units 68 in the second radio unit group 64 may be any number greater than or equal to 1. Further, $N_{G1}$ and $N_{G2}$ may or may not be equal, depending on the particular implementation. Further, in one embodiment, the radio units 66 and 68 in the two radio unit groups 62 and 64 serve the same coverage area (e.g., the same cell 16 where the dual-mode radio system 60 is implemented in the base station 12).

In this example, the radio units 66-1 through 66-$N_{G1}$ in the first radio unit group 62 are more specifically transceiver units that include transmitters (TX) 70-1 through 70-$N_{G1}$ (generally referred to herein collectively as transmitters 70 and individually as transmitter 70) and receivers (RX) 72-1 through 72-$N_{G1}$ (generally referred to herein collectively as receivers 72 and individually as receiver 72). The transmitters 70 and the receivers 72 are selectively coupled to corresponding antennas 74-1 through 74-$N_{G1}$ (generally referred to herein collectively as antennas 74 and individually as antenna 74) via switches 76-1 through 76-$N_{G1}$ (generally referred to herein collectively as switches 76 and individually as switch 76) and filters 78-1 through 78-$N_{G1}$ (generally referred to herein collectively as filters 78 and individually as filter 78), respectively. In this example, the transmitters 70 include DACs 80-1 through 80-$N_{G1}$ (generally referred to herein collectively as DACs 80 and individually as DAC 80) and PAs 82-1 through 82-$N_{G1}$ (generally referred to herein collectively as PAs 82 and individually as PA 82). However, as will be appreciated by one of ordinary skill in the art, the transmitters 70 may include additional components that are not illustrated such as, for example, filter(s), mixer(s), modulator(s), etc. The receivers 72 include LNAs 84-1 through 84-$N_{G1}$ (generally referred to herein collectively as LNAs 84 and individually as LNA 84) and ADCs 86-1 through 86-$N_{G1}$ (generally referred to herein collectively as ADCs 86 and individually as ADC 86). However, as will be appreciated by one of ordinary skill in the art, the receivers 72 may include additional components that are not illustrated such as, for example, filter(s), mixer(s), demodulator(s), etc.

In this example, the radio units 68-1 through 68-$N_{G2}$ in the second radio unit group 64 are also transceiver units that include transmitters (TX) 88-1 through 88-$N_{G2}$ (generally referred to herein collectively as transmitters 88 and individually as transmitter 88) and receivers (RX) 90-1 through 90-$N_{G2}$ (generally referred to herein collectively as receivers 90 and individually as receiver 90). The transmitters 88 and the receivers 90 are selectively coupled to corresponding antennas 92-1 through 92-$N_{G2}$ (generally referred to herein collectively as antennas 92 and individually as antenna 92) via switches 94-1 through 94-$N_{G2}$ (generally referred to herein collectively as switches 94 and individually as switch 94) and filters 96-1 through 96-$N_{G2}$ (generally referred to herein collectively as filters 96 and individually as filter 96), respectively. In this example, the transmitters 88 include DACs 98-1 through 98-$N_{G2}$ (generally referred to herein collectively as DACs 98 and individually as DAC 98) and PAs 100-1 through 100-$N_{G2}$ (generally referred to herein collectively as PAs 100 and individually as PA 100). However, as will be appreciated by one of ordinary skill in the art, the transmitters 88 may include additional components that are not illustrated such as, for example, filter(s), mixer(s), modulator(s), etc. The receivers 90 include LNAs 102-1 through 102-$N_{G2}$ (generally referred to herein collectively as LNAs 102 and individually as LNA 102) and ADCs 104-1 through 104-$N_{G2}$ (generally referred to herein collectively as ADCs 104 and individually as ADC 104). However, as will be appreciated by one of ordinary skill in the art, the receivers 90 may include additional components that are not illustrated such as, for example, filter(s), mixer(s), demodulator(s), etc.

The dual-mode radio system 60 is capable of operating in a full-duplex mode and a half-duplex mode by proper configuration of the switches 76 and 94. The switches are controlled by a controller 106. The controller 106 may be part of the dual-mode radio system 60 as illustrated or may be external to the dual-mode radio system 60 (e.g., implemented in an associated baseband unit or radio controller). For instance, the controller 106 may be implemented in software executed by a processor(s) within or associated with the base station 12. Further, the functionality of the controller 106 may be distributed across two or more network nodes (e.g., the base station 12 and another network node). The controller 106 is implemented in hardware, software, or a combination hardware and software. In one embodiment, the functionality of the controller 106 is implemented in software stored on a computer readable medium (e.g., a non-transitory computer readable medium such as memory) that is executable by a processor (e.g., a Central Processing Unit (CPU)) to perform the functionality of the controller 106. As illustrated, in this example, the controller 106 outputs a first control signal ($CNTRL_1$) that controls the switches 76 for the first radio unit group 62 and a second control signal ($CNTRL_2$) that controls the switches 94 for the second radio unit group 64.

FIG. 7A illustrates the full-duplex mode of operation for the dual-mode radio system 60 of FIG. 6 according to one embodiment of the present disclosure. In this embodiment, the controller 106 (FIG. 6) controls the switches 76 to couple the transmitters 70 (rather than the receivers 72) of the radio units 66 in the first radio unit group 62 to the corresponding antennas 74 and controls the switches 94 to couple the receivers 90 (rather than the transmitters 88) of the radio units 68 in the second radio unit group 64 to the corresponding antennas 92. In this manner, the dual-mode radio system 60 is enabled to simultaneously transmit via the radio units 66 in the first radio unit group 62 and receive via the radio units 68 in the second radio unit group 64 using the same frequency resources. Notably, in this regard, transmission and reception occur over the same frequency resources and, as such, the passbands of the filters 78 and 96 are the same for both transmission and reception.

When operating in the full-duplex mode, the transmissions from the radio units 66 in the first radio unit group 62 cause self-interference 108 during the simultaneous reception by the radio units 68 in the second radio unit group 64.

The passive isolation between the transmit and receive paths provided by physically separating the antennas 74 and 92 is large as compared to passive isolation provided by a duplexing device (e.g., a circulator) in a common antenna architecture. The amount of passive isolation can be increased by increasing the physical separation between the antennas 74 and 92 and/or by using known techniques for reducing the mutual coupling between the antennas 74 and 92. As a result, the requirements for self-interference cancellation in the dual-mode radio system 60 are reduced as compared to a common antenna architecture.

FIGS. 7B and 7C illustrate half-duplex operation for the dual-mode radio system 60 of FIG. 6 according to one embodiment of the present disclosure. As discussed above, half-duplex operation may be desired if, for example, performance of the self-interference cancellation subsystem is degraded. The half-duplex mode of operation includes a transmit phase (FIG. 7B) and a receive phase (FIG. 7C). In this example, in the transmit phase, the switches 76 are controlled such that the transmitters 70 of the radio units 66 in the first radio unit group 62 are coupled to the corresponding antennas 74, and the switches 94 are controlled such that the transmitters 88 of the radio units 68 in the second radio unit group 64 are coupled to the corresponding antennas 92. Likewise, in the receive phase, the switches 76 are controlled such that the receivers 72 of the radio units 66 in the first radio unit group 62 are coupled to the corresponding antennas 74, and the switches 94 are controlled such that the receivers 90 of the radio units 68 in the second radio unit group 64 are coupled to the corresponding antennas 92. In this manner, all of the antennas 74 and 92 are used during both the transmit phase and the receive phase. In doing so, the issue of wasted antennas is avoided and, compared to the separate antenna architecture of FIG. 4, more antennas are used for both transmission and reception, which improves the capacity of the downlink and the uplink, respectively. Notably, in the half-duplex mode, there is no self-interference 108 (FIGS. 6 and 7A) because either all radio units are transmitting (FIG. 7B) or all radio units are receiving (FIG. 7C).

FIG. 8 is a flow chart that illustrates the operation of the controller 106 of FIG. 6 according to one embodiment of the present disclosure. In this example, the controller 106 determines whether to operate in the full-duplex mode (step 1000). This determination may be made on any appropriate criterion or criteria such as, for example, whether the performance of the self-interference subsystem has fallen below a threshold. Further, in some embodiments, the full-duplex mode of operation is the default mode of operation, where fallback to the half-duplex mode of operation is available when needed or otherwise desired (e.g., for CSI measurements). If full-duplex operation is desired, then, in this embodiment, the controller 106 configures the dual-mode radio system 60 such that the radio units 66 in the first radio unit group 62 are each in the transmit mode (i.e., the switches 76 couple the transmitters 70 to the antennas 74) and the radio units 68 in the second radio unit group 64 are each in the receive mode (i.e., the switches 94 couple the receivers 90 to the antennas 92) (step 1002). While operating in the full-duplex mode, the controller 106 may, in some embodiments, periodically or otherwise determine whether operation should switch to the half-duplex mode (step 1004). For example, as discussed below, it may be desirable to switch to the half-duplex mode for CSI estimation. If the controller 106 determines that it is not to switch to the half-duplex mode of operation, full-duplex operation continues.

If half-duplex operation is desired as determined by either step 1000 or step 1004, the controller 106 configures the dual-mode radio system 60 such that both of the radio unit groups 62 and 64 are in the transmit mode of operation during a transmit phase of half-duplex operation (step 1006). Then, during a receive phase of half-duplex operation, the controller 106 configures the dual-mode radio system 60 such that both of the radio unit groups 62 and 64 are in the receive mode of operation (step 1008). In this example, the controller 106 then determines whether to switch to the full-duplex mode based on any suitable criterion or criteria (step 1010). Note, however, that the decision in step 1010 may occur at any desired point in the process (e.g., periodically or otherwise). In this example, if the dual-mode radio system 60 is to remain in the half-duplex mode, the process returns to step 1006. Otherwise, if the dual-mode radio system 60 is to switch to the full-duplex mode, the process proceeds to step 1002. Note that the process of FIG. 8 is just one example. The controller 106 may operate to control the dual-mode radio system 60 to provide full-duplex operation and half-duplex operation in any desired or suitable manner.

As mentioned above, in some embodiments, the dual-mode radio system 60 may be controlled to provide channel estimation (e.g., CSI estimation) for the channels between all of the antennas 74 and 92 and each of the individual wireless devices 14 using uplink or downlink training. Before describing this feature of the dual-mode radio system 60, a brief discussion of channel estimation when using the separate antenna architecture of FIG. 4 is beneficial. When using the separate antenna architecture of FIG. 4, the channel between the transmit antenna 44 and a particular wireless device 14 (i.e., the downlink channel) must be estimated using a downlink training procedure in which a training sequence is transmitted by the dual-mode radio system 38 via the antenna 44 and received at the wireless device 14. The wireless device 14 then estimates the downlink channel based on the received training sequence. In addition, the channel between the wireless device 14 and the receive antenna 46 of the dual-mode radio system 38 (i.e., the uplink channel) must be estimated using an uplink training procedure in which a training sequence is transmitted by the wireless device 14 and received at the dual-mode radio system 38 via the receive antenna 46. The base station 12 then estimates the uplink channel based on the received training sequence. Thus, both uplink and downlink training procedures are needed. In other words, since the dual-mode radio system 38 transmits and receives using separate antennas 44 and 46, the uplink and downlink channels are not reciprocal and must therefore be separately estimated. Further, if the total number of wireless device antennas is not nearly equal to the number of base station antennas, then either the uplink or downlink training will consume significantly more capacity than the other.

In contrast, the dual-mode radio system 60 of FIG. 6 may be configured to take advantage of reciprocal channels to provide channel estimation during a single channel estimation procedure. More specifically, FIG. 9 illustrates one embodiment of a channel estimation procedure for the dual-mode radio system 60 of FIG. 6. In this embodiment, the base station 12, and more specifically the controller 106, configures the dual-mode radio system 60 to operate in the receive phase of the half-duplex mode of operation such that all of the radio units 66 and 68 in both of the radio unit groups 62 and 64 operate in the receive mode (step 1100). The wireless device 14 transmits a training sequence (step 1102). Because the dual-mode radio system 60 is operating in the receive phase of the half-duplex mode of operation, the training sequence is received via all of the antennas 74 and 92. The channels (e.g., CSI) between the wireless device 14 and all of the antennas 74 and 92 of the dual-mode radio system 60 can be estimated based on the received training sequence (step 1104). Due to channel reciprocity, the channel estimates generated based on the uplink transmission from the wireless device 14 are equally applicable to both the downlink and uplink channels. Thus, using a single channel estimation procedure, the channels between all of the antennas 74 and 92 of the dual-mode radio system 60 and the wireless device 14 are estimated.

FIG. 10 illustrates another embodiment of a channel estimation procedure for the dual-mode radio system 60 of FIG. 6. In this embodiment, the base station 12, and more specifically the controller 106, configures the dual-mode radio system 60 in the transmit phase of the half-duplex mode of operation (step 1200). The base station 12 then transmits a training sequence via the dual-mode radio system 60 (step 1202). Because the dual-mode radio system 60 is configured in the transmit phase of the half-duplex mode of operation, the training sequence is transmitted via all of the antennas 74 and 92 of both of the radio unit groups 62 and 64. The wireless device 14 is then able to estimate the channels (e.g., CSI) between all of the antennas 74 and 92 of the dual-mode radio system 60 and the wireless device 14 based on the different received versions of the training sequence received from the corresponding antennas 74 and 92 of the dual-mode radio system 60 (step 1204).

In this example, the dual-mode radio system 60 of the base station 12 is then configured in either the receive phase of the half-duplex mode or the full-duplex mode (step 1206). While the dual-mode radio system 60 is in the receive phase of the half-duplex mode or the full-duplex mode, the wireless device 14 transmits the CSI for the channels between the wireless device 14 and the different antennas 74 and 92 of the dual-mode radio system 60 (step 1208). Due to channel reciprocity, the channel estimates generated based on the downlink transmission from the dual-mode radio system 60 are equally applicable to both the downlink and uplink channels. Thus, using a single channel estimation procedure, the channels between all of the antennas 74 and 92 of the dual-mode radio system 60 and the wireless device 14 are estimated.

As discussed above and as illustrated specifically in FIG. 7A, in the full-duplex mode of operation, some of the receivers 72 and 90 are idle and some of the transmitters 70 and 88 are idle. Specifically, in the example of FIG. 7A, in the full-duplex mode of operation, the receivers 72 of the radio units 66 in the first radio unit group 62 and the transmitters 88 of the radio units 68 in the second radio unit group 64 are idle. In some embodiments, the idle receivers or the idle transmitters can be used for self-interference cancellation. More specifically, FIG. 11 illustrates one example of an architecture that utilizes the idle transmitters 88 of the radio units 68 in the second radio unit group 64 for self-interference cancellation according to one embodiment of the present disclosure. In this embodiment, during full-duplex operation, the digital input signals of the transmitters 70 of the radio units 66 in the first radio unit group 62 are processed by a signal processing subsystem 110 and then injected into the inputs of the idle transmitters 88 of the radio units 68 in the second radio unit group 64 to provide corresponding self-interference cancellation signals at the outputs of the idle transmitters 88. In this example, the controller 106 controls switches 112-1 through 112-$N_{G2}$ (generally referred to herein collectively as switches 112 and individually as switch 112) to couple the outputs of the idle transmitters 88 to inputs of corresponding summation nodes 114-1 through 114-$N_{G2}$ (generally referred to herein collectively as summation nodes 114 and individually as summation node 114). The summation nodes 114 operate to sum the received signals from the antennas 92 and the self-interference cancellation signals from the transmitters 88 to provide compensated received signals. The compensated received signals are processed by the receivers 90 to provide corresponding output signals of the receivers 90. Note that any known or future developed technique may be used by the signal processing subsystem 110 to calibrate the self-interference cancellation signals such that the self-interference is minimized or sufficiently mitigated. One example is described in M. Duarte et al., "Full-Duplex Wireless Communications Using Off-The-Shelf Radios: Feasibility and First Results," 2010 Conference Record of the Forty Fourth Asilomar Conference on Signals, Systems and Computers, Nov. 7-10, 2010, Pacific Grove, Calif., pages 1558-1562.

FIG. 12 illustrates one example of an architecture that utilizes the idle receivers 72 of the radio units 66 in the first radio unit group 62 for self-interference cancellation according to one embodiment of the present disclosure. In this embodiment, during full-duplex operation, the RF transmit signals output by the transmitters 70 of the radio units 66 in the first radio unit group 62 coupled to the inputs of the idle receivers 72 of the radio units 66 in the first radio unit group 62 via corresponding tapping elements 116-1 through 116-$N_{G1}$ (generally referred to herein collectively as tapping elements 116 and individually as tapping element 116) and switches 118-1 through 118-$N_{G1}$ (generally referred to herein collectively as switches 118 and individually as switch 118). In one embodiment, direction couplers are used to tap the outputs of the transmitters 70, and the tapping elements 116 are attenuators that may be used to reduce the power level of the tapped signals, if desired. The resulting output signals of the idle receivers 72 are processed by the signal processing subsystem 110 to provide self-interference cancellation signals. Summation nodes 120-1 through 120-$N_{G2}$ (generally referred to herein collectively as summation nodes 120 and individually as summation node 120) combine the self-interference cancellation signals and the output signals of the receivers 90 of the radio units 68 in the second radio unit group 64 to provide compensated output signals. Note that any known or future developed technique may be used by the signal processing subsystem 110 to calibrate the self-interference cancellation signals such that the self-interference is minimized or sufficiently mitigated. One example is described in U.S. Pat. No. 8,199,681.

In the embodiments described above, the radio units 66 in the first radio unit group 62 and the radio units 68 in the second radio unit group 64 are all transceiver units (i.e., they all include transmitters 70, 88 and receivers 72, 90). However, the present dual-mode radio system 60 is not limited thereto. In other embodiments, the radio units 66, 68 of one of the radio unit groups 62 and 64 may include only the transmitters 70, 88 or only the receivers 72, 90. In this regard, FIG. 13 illustrates one embodiment of the dual-mode radio system 60 in which the radio units 68 of the second radio unit group 64 include only the receivers 90. In this embodiment, in the full-duplex mode, the radio units 66 of the first radio unit group 62 are configured in the transmit mode (i.e., the switches 76 are controlled to couple the transmitters 70 to the antennas 74), and the receivers 90 of the radio units 68 of the second radio unit group 64 are active. Conversely, in the transmit phase of the half-duplex mode of operation, the radio units 66 of the first radio unit group 62 are configured in the transmit mode and the receivers 90 of the radio units 68 of the second radio unit group 64 are inactive, or idle. In the receive phase of the half-duplex mode of operation, in one example, the radio units 66 of the first radio unit group 62 are configured in the receive mode and, in some embodiments, the receivers 90 of the radio units 68 in the second radio unit group 64 are active.

FIG. 14 illustrates another embodiment of the dual-mode radio system 60 in which the radio units 68 of the second radio unit group 64 include only the transmitters 88. In this embodiment, in the full-duplex mode, the radio units 66 of the first radio unit group 62 are configured in the receive mode (i.e., the switches 76 are controlled to couple the receivers 72 to the antennas 74), and the transmitters 88 of the radio units 68 of the second radio unit group 64 are active. Conversely, in the transmit phase of the half-duplex mode of operation, the radio units 66 of the first radio unit group 62 are configured in the transmit mode and, in some embodiments, the transmitters 88 of the radio units 68 of the second radio unit group 64 are active. In the receive phase of the half-duplex mode of operation, the radio units 66 of the first radio unit group 62 are configured in the receive mode and the transmitters 88 of the radio units 68 in the second radio unit group 64 are inactive, or idle.

The embodiments above, particularly those of FIGS. 6 through 12, describe full-duplex architectures with separate antennas 74 and 92 for transmit and receive and transceivers behind each antenna 74, 92. When the dual-mode radio system 60 is operating in the full-duplex mode of operation, the wireless devices 14 connected to the base station 12 can also operate in a full-duplex mode of operation but may alternatively operate in a half-duplex, or TDD, mode of operation. In either case, the wireless devices 14 connect to one set of antennas 74 for the downlink and the other set of antennas 92 for the uplink. As discussed above, CSI estimation for the embodiments described above can be performed for both the uplink and downlink by configuring the dual-mode radio system 60 in the half-duplex mode of operation. Due to channel reciprocity, only one direction needs to be estimated between the dual-mode radio system 60 and each wireless device 14. One issue is that CSI needs to be estimated between each of the antennas 74 and 92 and each of the antennas of the wireless devices 14. Channel reciprocity cannot be used to reduce the number of CSI estimates because, in the full-duplex mode, the uplink and the downlink do not share common antennas. This means that N×K CSI estimates are needed per wireless device, where N=$N_{G1}$+$N_{G2}$ and K is a number of antennas of the wireless device 14. It would be advantageous, in some implementations, if a wireless device 14 connects to the same set of antennas 74, 92 for both uplink and downlink so that channel reciprocity can be used to halve the number of channel, or CSI, estimates needed. However, full-duplex operation in the base station 12 will be more reliable if separate antennas are used for transmit and receive in the base station 12.

In this regard, FIGS. 15A through 15C and 16 illustrate a full-duplex mode of operation for the dual-mode radio system 60 according to another embodiment of the present disclosure. In this embodiment, in the full-duplex mode of operation, the first radio unit group 62 and the second radio unit group 64 operate in a half-duplex, or TDD, mode of operation but in anti-phase with one another. As used herein, the two radio unit groups 62 and 64 operate in anti-phase with one another when the radio units 66 in the first radio unit group 62 are transmitting while the radio units 68 in the second radio unit group 64 are receiving and vice versa. Individually, the radio unit groups 62 and 64 operate in a half-duplex, or TDD, mode of operation; but, together, the radio unit groups 62 and 64 provide a full-duplex mode of operation for the dual-mode radio system 60. The anti-phase TDD radio units 66 and 68 in the radio unit groups 62 and 64 enable the two radio unit groups 62 and 64 to operate essentially in an independent manner to, e.g., serve different sets of TDD wireless devices.

Figure 15A:
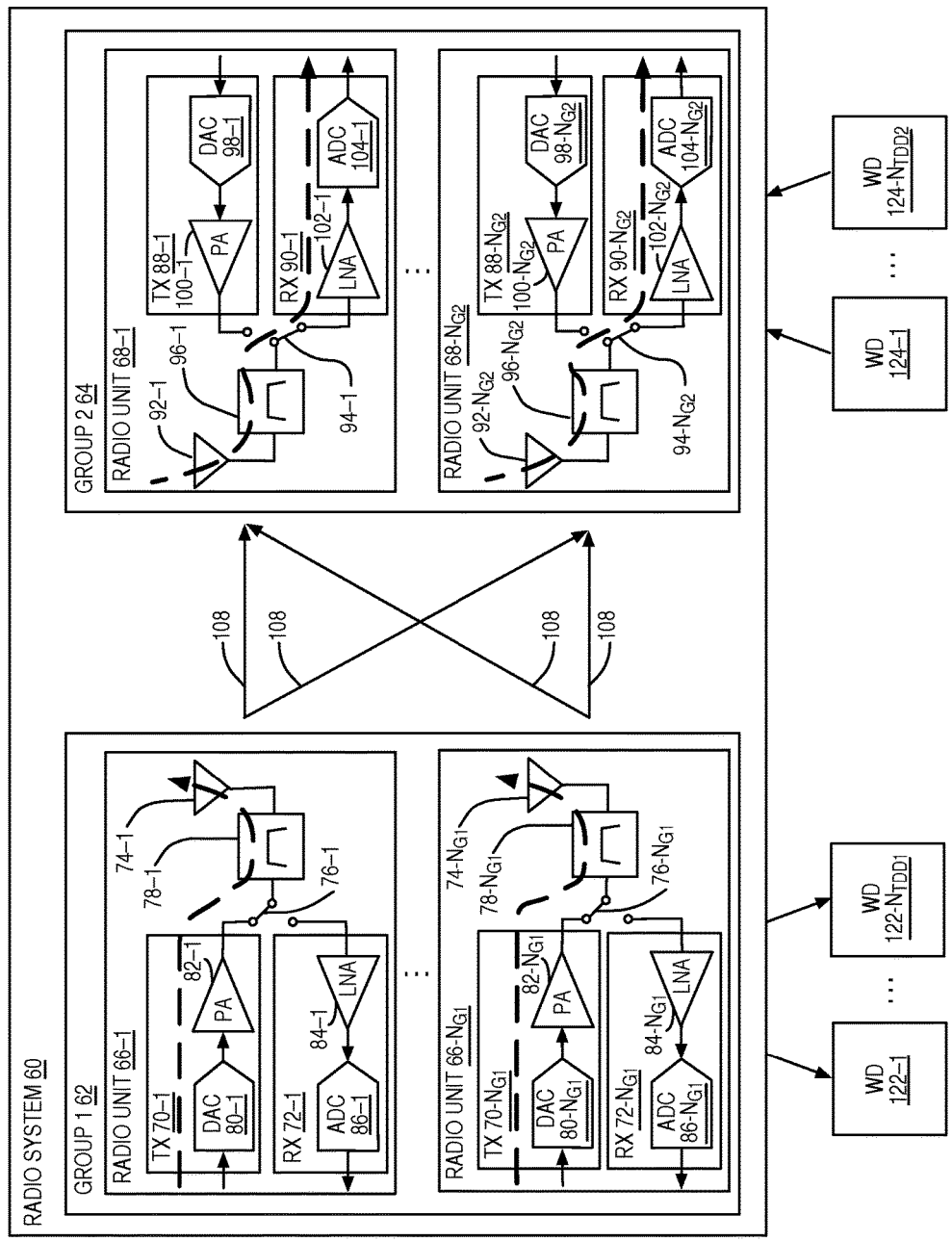
Figure 16:
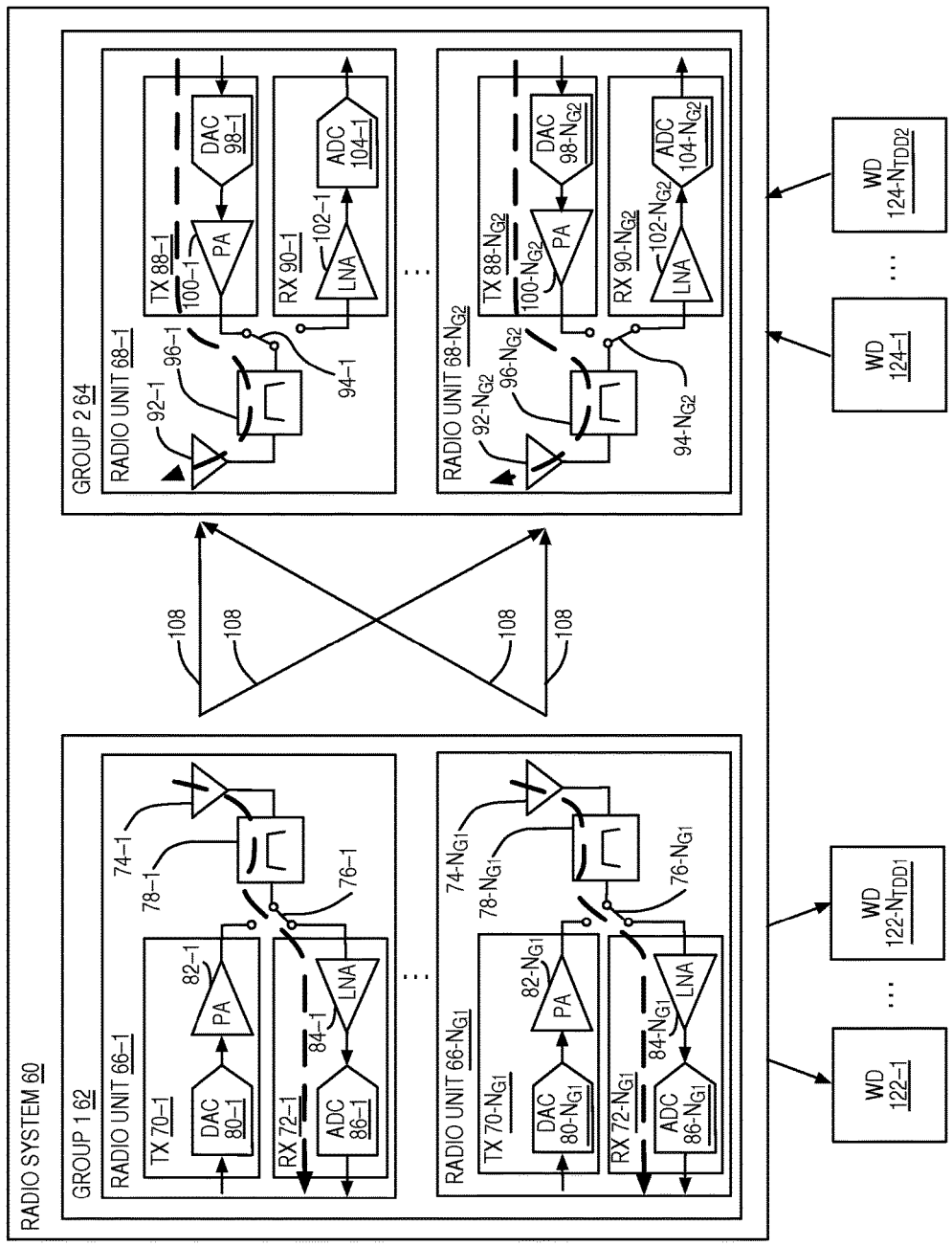

As illustrated in FIGS. 15A and 16, when the dual-mode radio system 60 is operating in the full-duplex mode, a first group of wireless devices 122-1 through 122-$N_{TDD1}$ (generally referred to herein collectively as wireless devices 122 and individually as wireless device 122) operating in a TDD mode connect to the first radio unit group 62 for both the uplink and the downlink. Likewise, a second group of wireless devices 124-1 through 124-$N_{TDD2}$ (generally referred to herein collectively as wireless devices 124 and individually as wireless device 124) operating in a TDD mode connect to the second radio unit group 64 for both the uplink and the downlink. This is beneficial in that the number of channels that need to be estimated for any particular wireless device 122, 124 is half as many as need to be estimated when using different antennas for transmit and receive. Reducing the number of channels that need to be estimated reduces the computational complexity (e.g., reduces the size of the Multi-User Multiple-Input Multiple-Output (MU-MIMO) or Space-Division Multiple Access (SDMA) precoding matrix).

Figure 15B:
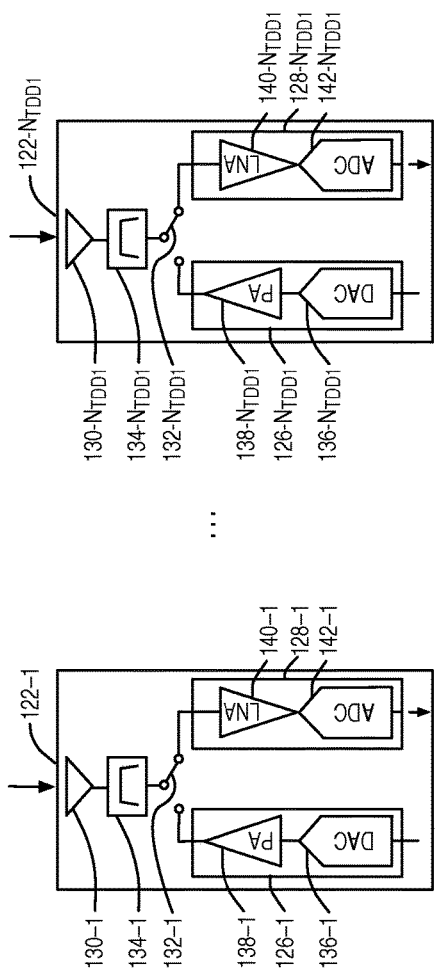

As shown in FIG. 15B, the wireless devices 122 connected to the first radio unit group 62 include transmitters 126-1 through 126-$N_{TDD1}$ (generally referred to herein collectively as transmitters 126 and individually as transmitter 126) and receivers 128-1 through 128-$N_{TDD1}$ (generally referred to herein collectively as receivers 128 and individually as receiver 128) selectively coupled to corresponding antennas 130-1 through 130-$N_{TDD1}$ (generally referred to herein collectively as antennas 130 and individually as antenna 130) via switches 132-1 through 132-$N_{TDD1}$ (generally referred to herein collectively as switches 132 and individually as switch 132) and filters 134-1 through 134-$N_{TDD1}$ (generally referred to herein collectively as filters 134 and individually as filter 134). In this example, the transmitters 126 include DACs 136-1 through 136-$N_{TDD1}$ (generally referred to herein collectively as DACs 136 and individually as DAC 136) and PAs 138-1 through 138-$N_{TDD1}$ (generally referred to herein collectively as PAs 138 and individually as PA 138), respectively. However, the transmitters 126 may include additional or alternative components, as will be understood by one of ordinary skill in the art upon reading this disclosure. In a similar manner, the receivers 128 include, in this example, LNAs 140-1 through 140-$N_{TDD1}$ (generally referred to herein collectively as LNAs 140 and individually as LNA 140) and ADCs 142-1 through 142-$N_{TDD1}$ (generally referred to herein collectively as ADCs 142 and individually as ADC 142), respectively. However, the receivers 128 may include additional or alternative components, as will be understood by one of ordinary skill in the art upon reading this disclosure.

Figure 15C:
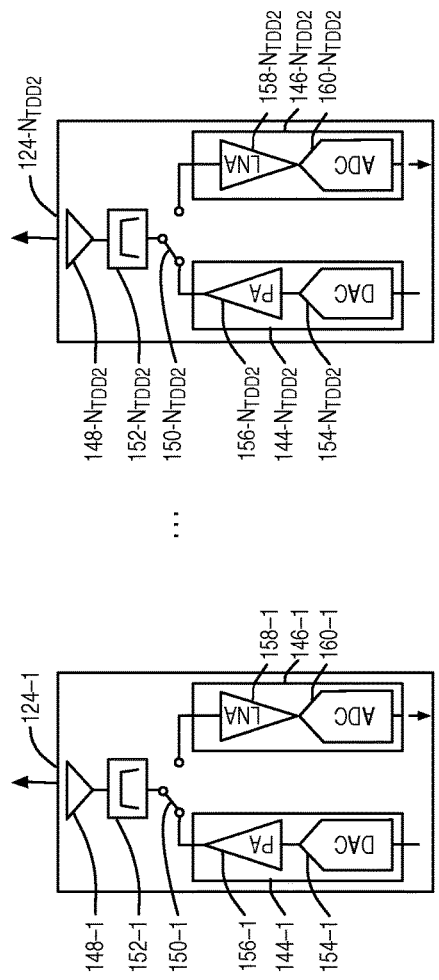

In the same manner, as shown in FIG. 15C, the wireless devices 124 connected to the second radio unit group 64 include transmitters 144-1 through 144-$N_{TDD2}$ (generally referred to herein collectively as transmitters 144 and individually as transmitter 144) and receivers 146-1 through 146-$N_{TDD2}$ (generally referred to herein collectively as receivers 146 and individually as receiver 146) selectively coupled to corresponding antennas 148-1 through 148-$N_{TDD2}$ (generally referred to herein collectively as antennas

148 and individually as antenna 148) via switches 150-1 through 150-N$_{TDD2}$ (generally referred to herein collectively as switches 150 and individually as switch 150) and filters 152-1 through 152-N$_{TDD2}$ (generally referred to herein collectively as filters 152 and individually as filter 152). In this example, the transmitters 144 include DACs 154-1 through 154-N$_{TDD2}$ (generally referred to herein collectively as DACs 154 and individually as DAC 154) and PAs 156-1 through 156-N$_{TDD2}$ (generally referred to herein collectively as PAs 156 and individually as PA 156), respectively. However, the transmitters 144 may include additional or alternative components, as will be understood by one of ordinary skill in the art upon reading this disclosure. In a similar manner, the receivers 146 include, in this example, LNAs 158-1 through 158-N$_{TDD2}$ (generally referred to herein collectively as LNAs 158 and individually as LNA 158) and ADCs 160-1 through 160-N$_{TDD2}$ (generally referred to herein collectively as ADCs 160 and individually as ADC 160), respectively. However, the receivers 146 may include additional or alternative components, as will be understood by one of ordinary skill in the art upon reading this disclosure.

In operation, during a first phase of the full-duplex operation, the radio units 66 in the first radio unit group 62 are configured in the transmit mode, and the radio units 68 in the second radio unit group 64 are configured in the receive mode, as illustrated in FIG. 15A. Thus, the wireless devices 122 connected to the first radio unit group 62 (FIG. 15B) operate in a receive phase, and the wireless devices 124 connected to the second radio unit group 64 (FIG. 15C) operate in a transmit phase. Then, as illustrated in FIG. 16, during a second phase, the radio units 66 in the first radio unit group 62 are configured in the receive mode, and the radio units 68 in the second radio unit group 64 are configured in the transmit mode. Thus, the wireless devices 122 connected to the first radio unit group 62 operate in a transmit phase, and the wireless devices 124 connected to the second radio unit group 64 operate in a receive phase. The radio unit groups 62 and 64 simultaneously transition between the two phases of full-duplex operation, but are anti-phase with one another. In this manner, there is always one of the radio unit groups 62, 64 transmitting and one of the radio unit groups 62, 64 receiving. While not illustrated, both of the radio unit groups 62 and 64 may be configured to operate in-phase, rather than anti-phase, to provide a half-duplex mode of operation of the dual-mode radio system 60.

Notably, being anti-phase with one another means that the TDD Downlink-to-Uplink (DL:UL) ratios for the two radio unit groups 62 and 64 will be the opposite of one another. For example, if the DL:UL ratio for the first radio unit group 62 is 2:1, then the DL:UL ratio for the second radio unit group 64 will be 1:2. As another example, if the radio unit group 62 has a TDD frame with 90% downlink and 10% uplink, then it is necessary for anti-phase operation that the radio unit group 64 has a TDD frame with 10% downlink and 90% uplink. As with conventional TDD radio systems, guard intervals may exist between transitions from transmit to receive and from receive to transmit. These guard intervals are synchronized between the two radio unit groups 62 and 64.

In one particular implementation, the two radio unit groups 62 and 64 have the same DL:UL ratio (i.e., 1:1), which in turn means that the two radio unit groups 62 and 64 have equal amounts of transmit phases and receive phases. In this case, in some embodiments, the base station 12 may activate just one of the two radio unit groups 62, 64 in the half-duplex or TDD mode and only activate the other of the two radio unit groups 62, 64 (which operates in anti-phase) when the extra capacity is needed or otherwise desired. However, it is not necessary to shut-down, or de-activate, one of the two radio unit groups 62, 64 when operating in the half-duplex mode. Instead, both of the radio unit groups 62 and 64 may be operated in-phase with one another to thereby increase the number of antennas used by the base station 12 in the half-duplex mode.

Unequal TDD DL:UL ratios for the two radio unit groups 62 and 64 may be beneficial to enable assignment of a particular wireless device 14 to the radio unit group 62, 64 having a TDD DL:UL ratio that most closely matches the demands of the wireless device 14. For example, if the first radio unit group 62 has a TDD DL:UL ratio of 9:1 and the second radio unit group 64 has a TDD DL:UL ratio of 1:9, then a particular wireless device 14 that is downloading streaming video may be assigned to the first radio unit group 62 (i.e., becomes one of the wireless devices 122 connected to the first radio unit group 62), whereas a particular wireless device 14 that is uploading pictures may be assigned to the second radio unit group 64 (i.e., becomes one of the wireless devices 124 connected to the second radio unit group 64). In some embodiments, the base station 12 may operate to dynamically switch a particular wireless device 14 between the two radio unit groups 62 and 64 based on dynamically changing demands of that wireless device 14. Note that other criteria may be considered when assigning wireless devices 14 to the two radio unit groups 62 and 64 such as, for example, inter-wireless device interference. Wireless devices 14 that would or do strongly interfere with one another may not be assigned to the same radio unit group 62, 64.

FIG. 17 illustrates one example of a TDD frame with the uplink and downlink subframes shown for the two radio unit groups 62 and 64. This example TDD frame illustrates the anti-phase operation of the two radio unit groups 62 and 64. In this example, in subframes 0 through 5, the radio units 66 in the first radio unit group 62 are transmitting, and the radio units 68 in the second radio unit group 64 are receiving. This corresponds to the full-duplex phase illustrated in FIG. 15A. In contrast, in subframes 6-9, the radio units 66 in the first radio unit group 62 are receiving, and the radio units 68 in the second radio unit group 64 are transmitting. This corresponds to the full-duplex phase illustrated in FIG. 16.

In the embodiment of FIGS. 15A and 16, both the downlink and uplink channels for a particular wireless device 122, 124 go to the antennas 74, 92 of the same radio unit group 62, 64. As such, CSI only needs to be estimated in one direction, based on channel reciprocity, and for only the antennas 74, 92 of the radio unit group 62, 64 to which the wireless device 122, 124 is connected. Furthermore, multi-user interference (for MU-MIMO, SDMA, and the like) for wireless devices that are connected to different radio unit groups 62, 64 is orthogonal in time (excluding wireless device-to-wireless device interference), which means that the precoding and detection matrices for the first radio unit group 62 does not need to include the channels that go to the wireless devices 124 connected to the second radio unit group 64. This significantly reduces the size of the precoding and detection matrices, which means that the computational complexity of the matrix operations is reduced.

In the embodiments of FIGS. 15A, 16, and 17, there are only two radio unit groups 62 and 64. However, the dual-mode radio system 60 may, in some embodiments, include more than two radio unit groups as illustrated in FIG. 18.

Specifically, as illustrated in FIG. 18, the dual-mode radio system 60 includes the first and second radio unit groups 62 and 64 as well as one or more additional radio unit groups 162. In one embodiment, both the first and second radio unit groups 62 and 64 as well as the one or more additional radio unit groups 162 all serve the same coverage area (e.g., cell). As illustrated, each of the one or more additional radio unit groups 162 includes a number of radio units 164-1 through 164-$N_{GX}$ (generally referred to herein collectively as radio units 164 and individually as radio unit 164). In this embodiment, each of the radio units 164 in the additional radio unit group 162 are more specifically transceiver units that include transmitters (TX) 166-1 through 166-$N_{GX}$ (generally referred to herein collectively as transmitters 166 and individually as transmitter 166) and receivers (RX) 168-1 through 168-$N_{GX}$ (generally referred to herein collectively as receivers 168 and individually as receiver 168). The transmitters 166 and the receivers 168 are selectively coupled to corresponding antennas 170-1 through 170-$N_{GX}$ (generally referred to herein collectively as antennas 170 and individually as antenna 170) via switches 172-1 through 172-$N_{GX}$ (generally referred to herein collectively as switches 172 and individually as switch 172) and filters 174-1 through 174-$N_{GX}$ (generally referred to herein collectively as filters 174 and individually as filter 174), respectively. In this example, the transmitters 166 include DACs 176-1 through 176-$N_{GX}$ (generally referred to herein collectively as DACs 176 and individually as DAC 176) and PAs 178-1 through 178-$N_{GX}$ (generally referred to herein collectively as PAs 178 and individually as PA 178). However, as will be appreciated by one of ordinary skill in the art, the transmitters 166 may include additional components that are not illustrated such as, for example, filter(s), mixer(s), modulator(s), etc. The receivers 168 include LNAs 180-1 through 180-$N_{GX}$ (generally referred to herein collectively as LNAs 180 and individually as LNA 180) and ADCs 182-1 through 182-$N_{GX}$ (generally referred to herein collectively as ADCs 182 and individually as ADC 182). However, as will be appreciated by one of ordinary skill in the art, the receivers 168 may include additional components that are not illustrated such as, for example, filter(s), mixer(s), demodulator(s), etc.

As illustrated, for full-duplex operation, each of the radio unit groups 62, 64, and 162 operate in a TDD mode of operation. At any time, one or more of the radio unit groups 62, 64, and 162 can be in the transmit mode and one or more of the radio unit groups 62, 64, and 162 can be in the receive mode. In general, each of the radio unit groups 62, 64, and 162 has its own TDD configuration (e.g., TDD DL:UL ratio, duty cycle, etc.). In other words, the radio unit groups 62, 64, and 162 have independent TDD configurations. Further, using their TDD configurations, the radio unit group 62 serves the wireless devices 122 connected to the first radio unit group 62 for TDD communication (i.e., for both downlink and uplink), the radio unit group 64 serves the wireless devices 124 connected to the first radio unit group 64 for TDD communication (i.e., for both downlink and uplink), and each additional radio unit group 162 serves an additional set of wireless devices 184-1 through 184-$N_{TDDX}$ (generally referred to herein collectively as wireless devices 184 and individually as wireless device 184).

In one embodiment, the radio unit groups 62, 64, and 162 have different TDD configurations and may have overlapping transmit and/or receive phases. For example, FIG. 19 illustrates one example of a frame structure showing the transmit and receive phases for three radio unit groups 62, 64, and 162. As shown, in this example, the radio unit group 62 (Group 1) has a transmit phase or downlink phase that corresponds to subframes 0 through 6 and a receive phase or uplink phase that corresponds to subframes 7 through 9. The radio unit group 64 (Group 2) has a receive phase or uplink phase that corresponds to subframes 0 through 4 and a transmit phase or downlink phase that corresponds to subframes 5 through 9, and the radio unit group 162 (Group 3) has a receive phase or uplink phase that corresponds to subframes 0 through 5 and a transmit phase or downlink phase that corresponds to subframes 6 through 9. Thus, the three radio unit groups 62, 64, and 162 have different TDD DL:UL ratios.

Notably, in the example of FIG. 19, there are several subframes with overlapping downlink or uplink phases between the different radio unit groups 62, 64, and 162. As an example, in subframe 0, both the second radio unit group 62 (Group 2) and the additional radio unit group 162 (Group 3) operate in the uplink mode. Another example is during subframe 6 where all of the radio unit groups 62, 64, and 162 operate in the downlink mode, which means the base station 12 is not operating in full-duplex during subframe 6. The downlink subframes having overlapping downlink phases may precode across multiple groups to minimize multi-user access interference. Similarly, the uplink subframes having overlapping uplink phases may perform detection across multiple groups in a similar manner to multi-user detection. In subframes in which uplink and downlink transmissions occur simultaneously, self-interference mitigation technique(s) may be used to reduce self-interference.

In a manner similar to that discussed above with respect to the embodiment of FIGS. 15A, 15B, 15C, and 16, in one embodiment, the different TDD configurations of the radio unit groups 62, 64, and 162 may be used to serve wireless devices 122, 124, and 184 having different uplink and downlink demands. For instance, using the example of FIG. 18, the wireless devices 122 assigned to the first radio unit group 62 may be wireless devices having high downlink demands (e.g., wireless devices that are streaming video or other media content), the wireless devices 124 assigned to the second radio unit group 64 may be wireless devices having balanced downlink and uplink demands, and the wireless devices 184 assigned to the additional radio unit group 162 may be wireless devices having high uplink demands (e.g., wireless devices that are uploading content such as, for example, photos). Further, the wireless devices 122, 124, and 184 may, in some embodiments, be dynamically switched between the radio unit groups 62, 64, and 162 based on the dynamic uplink and downlink demands of the wireless devices 122, 124, and 184.

While the base stations 12 (or any type of as cellular access nodes) may be implemented in hardware or any combination of hardware and/or software, FIG. 20 is a block diagram of one of the base stations 12 of FIG. 1 according to one embodiment of the present disclosure. Note that while the base stations 12 are discussed herein, the functionality of the base stations 12 described herein can be performed by any type of cellular radio access node (e.g., a Radio Access Network (RAN) node, a base station, an enhanced Node B (eNB), a Radio Network Controller (RNC), or the like). As illustrated, the base station 12 includes a baseband unit 186 including a processor 188, memory 190, and a network interface 192 and the dual-mode radio system 60. In one embodiment, the some of the functionality of the base station 12 described herein (e.g., the functionality of the controller 106) is implemented in software stored in the memory 190 and executed by the processor 188. Additionally, the base station 12 may include additional components responsible for providing additional functionality, including any of the functionality described above and/or any functionality necessary to support the embodiments described herein.

In one embodiment, a computer program is provided that includes instructions which, when executed on at least one processor, cause the at least one processor to carry out any of the embodiments of the base station 12 described above. In one embodiment, a carrier containing the computer program is provided, wherein the carrier is one of an electronic signal, an optical signal, a radio signal, or a computer readable storage medium (e.g., a non-transitory computer readable medium).

While the wireless devices 14, 122, 124, and 184 may be implemented in any type of hardware or any combination of hardware and software, FIG. 21 is a block diagram of a wireless device 194 according to one embodiment of the present disclosure. As illustrated, the wireless device 194 includes a processor 196, memory 198, and a transceiver 200 coupled to one or more antennas 202. In particular embodiments, some or all of the functionality described above as being provided by the wireless device 14, 122, 124, or 184 may be provided by the processor 196 executing instructions stored on a computer-readable medium, such as the memory 198. Alternative embodiments of the wireless device 194 may include additional components responsible for providing additional functionality, including any of the functionality identified above and/or any functionality necessary to support the embodiments described above.

In one embodiment, a computer program is provided that includes instructions which, when executed on at least one processor, cause the at least one processor to carry out any of the embodiments of the wireless device 194 described above. In one embodiment, a carrier containing the computer program is provided, wherein the carrier is one of an electronic signal, an optical signal, a radio signal, or a computer readable storage medium (e.g., a non-transitory computer readable medium).

The following acronyms are used throughout this disclosure.

- ADC Analog-to-Digital Converter
- dB Decibel
- CPU Central Processing Unit
- CSI Channel State Information
- DAC Digital-to-Analog Converter
- DL:UL Downlink-to-Uplink
- eNB Enhanced Node B
- FDD Frequency Division Duplexing
- LNA Low Noise Amplifier
- MU-MIMO Multi-User Multiple-Input Multiple-Output
- PA Power Amplifier
- RAN Radio Access Network
- RF Radio Frequency
- RNC Radio Network Controller
- RX Receiver
- SDMA Space-Division Multiple Access
- TDD Time Division Duplexing
- TX Transmitter
- UE User Equipment Those skilled in the art will recognize improvements and modifications to the embodiments of the present disclosure. All such improvements and modifications are considered within the scope of the concepts disclosed herein and the claims that follow.

What is claimed is:

1. A radio system for a wireless node in a wireless communications system, the radio system comprising:
   a first radio unit comprising:
      a transmitter;
      a receiver;
      an antenna; and
      switching circuitry adapted to couple either an output of the transmitter of the first radio unit or an input of the receiver of the first radio unit to the antenna of the first radio unit; and
   a second radio unit comprising:
      an antenna; and
      one of: a transmitter having an output coupled to the antenna of the second radio unit, a receiver having an input coupled to the antenna of the second radio unit, and both a transmitter having an output selectively coupled to the antenna of the second radio unit and a receiver having an input selectively coupled to the antenna of the second radio unit,
   wherein the radio system has a full-duplex mode of operation in which the radio system operates to simultaneously transmit and receive on a same frequency channel, and a half-duplex mode of operation in which the radio system operates to transmit and receive on the same frequency channel at different times, and wherein in the full-duplex mode of operation, the receiver of one of the first and second radio units is idle and is utilized to provide self-interference cancellation.

2. The radio system of claim 1, wherein the second radio unit comprises:
   the transmitter;
   the receiver;
   the antenna; and
   switching circuitry adapted to couple either an output of the transmitter of the second radio unit or an input of the receiver of the second radio unit to the antenna of the second radio unit.

3. The radio system of claim 2, wherein, when operating in the full-duplex mode of operation:
   the transmitter of the first radio unit is active and the switching circuitry of the first radio unit couples the output of the transmitter of the first radio unit to the antenna of the first radio unit.

4. The radio system of claim 3, wherein:
   when operating in a transmit phase of the half-duplex mode of operation:
      the transmitter of the first radio unit is active and the switching circuitry of the first radio unit couples the output of the transmitter of the first radio unit to the antenna of the first radio unit; and
      the transmitter of the second radio unit is active and the switching circuitry of the second radio unit couples the output of the transmitter of the second radio unit to the antenna of the second radio unit; and
   when operating in a receive phase of the half-duplex mode of operation:
      the receiver of the first radio unit is active and the switching circuitry of the first radio unit couples the input of the receiver of the first radio unit to the antenna of the first radio unit; and
      the receiver of the second radio unit is active and the switching circuitry of the second radio unit couples the input of the receiver of the second radio unit to the antenna of the second radio unit.

5. The radio system of claim 2, wherein, when operating in the full-duplex mode of operation, the first radio unit and the second radio unit have different Time Division Duplexing, TDD, configurations.

6. The radio system of claim 5, wherein the different TDD configurations comprise different TDD uplink to downlink ratios.

7. The radio system of claim 5, wherein the different TDD configurations comprise different TDD transmit phases and different TDD receive phases.

8. The radio system of claim 5, wherein a TDD transmit phase of the first radio unit is anti-phase with a TDD transmit phase of the second radio unit, and a TDD receive phase of the first radio unit is anti-phase with a TDD receive phase of the second radio unit.

9. The radio system of claim 5, wherein, when operating in the full-duplex mode of operation:
during a first phase of the full-duplex mode of operation:
the transmitter of the first radio unit is active and the switching circuitry of the first radio unit couples the output of the transmitter of the first radio unit to the antenna of the first radio unit;
during a second phase of the full-duplex mode of operation:
the transmitter of the second radio unit is active and the switching circuitry of the second radio unit couples the output of the transmitter of the second radio unit to the antenna of the second radio unit.

10. The radio system of claim 5, wherein different sets of wireless devices operating in a TDD mode of operation are connected to the first radio unit and the second radio unit.

11. The radio system of claim 5, further comprising one or more additional radio units, wherein the first radio unit, the second radio unit, and the one or more additional radio units have different TDD configurations.

12. The radio system of claim 11, wherein a TDD transmit phase of at least one of the first radio unit, the second radio unit, and the one or more additional radio units partially overlaps a TDD receive phase of at least one other of the first radio unit, the second radio unit, and the one or more additional radio units.

13. The radio system of claim 1, wherein the radio system further comprises:
a first group of radio units comprising the first radio unit and one or more additional first radio units, each radio unit in the first group of radio units comprising:
a transmitter;
a receiver;
an antenna; and
switching circuitry adapted to couple either an output of the transmitter of the radio unit in the first group of radio units or an input of the receiver of the radio unit in the first group of radio units to the antenna of the radio unit; and
a second group of radio units comprising the second radio unit and one or more additional second radio units, each radio unit in the second group of radio units comprising:
an antenna; and
one of: a transmitter having an output coupled to the antenna of the radio unit in the second group of radio units, a receiver having an input coupled to the antenna of the radio unit in the second group of radio units, and both a transmitter having an output selectively coupled to the antenna of the radio unit in the second group of radio units and a receiver having an input selectively coupled to the antenna of the radio unit in the second group of radio units.

14. The radio system of claim 13, wherein each radio unit in the second group of radio units comprises the receiver but not the transmitter.

15. The radio system of claim 13, wherein each radio unit in the second group of radio units comprises the transmitter but not the receiver.

16. The radio system of claim 13, wherein each radio unit in the second group of radio units comprises:
the transmitter;
the receiver;
the antenna; and
switching circuitry adapted to couple either an output of the transmitter of the radio unit in the second group of radio units or an input of the receiver of the radio unit in the second group of radio units to the antenna of the radio unit in the second group of radio units.

17. The radio system of claim 16, wherein in the full-duplex mode of operation:
for each radio unit in the first group of radio units, the transmitter of the radio unit in the first group of radio units is active and the switching circuitry of the radio unit in the first group of radio units couples the output of the transmitter of the radio unit in the first group of radio units to the antenna of the radio unit in the first group of radio units.

18. The radio system of claim 17, wherein:
when operating in a transmit phase of the half-duplex mode of operation:
for each radio unit in the first group of radio units, the transmitter of the radio unit in the first group of radio units is active and the switching circuitry of the radio unit in the first group of radio units couples the output of the transmitter of the radio unit in the first group of radio units to the antenna of the radio unit in the first group of radio units; and
for each radio unit in the second group of radio units, the transmitter of the radio unit in the second group of radio units is active and the switching circuitry of the radio unit in the second group of radio units couples the output of the transmitter of the radio unit in the second group of radio units to the antenna of the radio unit in the second group of radio units; and
when operating in a receive phase of the half-duplex mode of operation:
for each radio unit in the first group of radio units, the receiver of the radio unit in the first group of radio units is active and the switching circuitry of the radio unit in the first group of radio units couples the input of the receiver of the radio unit in the first group of radio units to the antenna of the radio unit in the first group of radio units; and
for each radio unit in the second group of radio units, the receiver of the radio unit in the second group of radio units is active and the switching circuitry of the radio unit in the second group of radio units couples the input of the receiver of the radio unit in the second group of radio units to the antenna of the radio unit in the second group of radio units.

19. The radio system of claim 1, wherein, when operating in the full-duplex mode of operation, the transmitter of one of the first and second radio units is idle and is utilized to provide self-interference cancellation.

20. The radio system of claim 1, wherein the second radio unit comprises at least the receiver, and the radio system is configured to:
receive a training sequence transmitted by a wireless device via the receiver of each of the first and second radio units; and
estimate channel state information for a channel between the wireless device and each antenna of the first and second radio units based on the training sequence received via a receiver of each radio unit in a first group of radio units and a second group of radio units.

21. The radio system of claim 1, wherein the second radio unit comprises at least the transmitter, and the radio system is configured to:

transmit a training sequence for channel estimation between the radio system and one or more wireless devices via the transmitter of each of the first and second radio units.

22. The radio system of claim 1, wherein the wireless communications system is a cellular communications network, and the wireless node is a base station.

23. The radio system of claim 1, wherein the wireless communications system is a cellular communications network, and the wireless node is a wireless device connected to the cellular communications network.

24. The radio system of claim 1, wherein the second radio unit comprises the receiver but not the transmitter.

25. The radio system of claim 1, wherein the second radio unit comprises the transmitter but not the receiver.

* * * * *